United States Patent [19]
Cook et al.

[11] Patent Number: 5,766,075
[45] Date of Patent: Jun. 16, 1998

[54] BET GUARANTEE SYSTEM

[75] Inventors: Thomas W. Cook, Linwood; James V. LoCicero, Hammonton, both of N.J.

[73] Assignee: Harrah's Operating Company, Inc., Memphis, Tenn.

[21] Appl. No.: 725,575

[22] Filed: Oct. 3, 1996

[51] Int. Cl.[6] .................................................. A63F 9/24
[52] U.S. Cl. .................................................. 463/25
[58] Field of Search .................................. 463/1, 25, 29, 463/40, 42; 264/410, 411, 412; 235/380, 381, 382, 382.5

[56] References Cited

U.S. PATENT DOCUMENTS

| | | |
|---|---|---|
| 3,679,875 | 7/1972 | Rawson et al. . |
| 3,810,566 | 5/1974 | Adams et al. . |
| 3,848,112 | 11/1974 | Weichselbaum et al. . |
| 3,921,318 | 11/1975 | Calavetta . |
| 3,958,690 | 5/1976 | Gee, Sr. . |
| 4,121,574 | 10/1978 | Lester . |
| 4,164,320 | 8/1979 | Irazoqui et al. . |
| 4,208,795 | 6/1980 | Mühlemann et al. . |
| 4,234,932 | 11/1980 | Gorgens . |
| 4,236,332 | 12/1980 | Domo . |
| 4,288,659 | 9/1981 | Atalla . |
| 4,318,554 | 3/1982 | Anderson et al. . |
| 4,501,957 | 2/1985 | Perlman et al. . |
| 4,557,693 | 12/1985 | Elggren . |
| 4,582,985 | 4/1986 | Löfberg . |
| 4,614,366 | 9/1986 | North et al. . |
| 4,621,188 | 11/1986 | Stockburger et al. . |
| 4,632,428 | 12/1986 | Brown . |
| 4,688,169 | 8/1987 | Joshi . |
| 4,692,601 | 9/1987 | Nakano . |
| 4,737,912 | 4/1988 | Ichikawa . |
| 4,857,716 | 8/1989 | Gombrich et al. . |
| 4,908,516 | 3/1990 | West . |
| 4,995,081 | 2/1991 | Leighton et al. . |
| 5,036,610 | 8/1991 | Fehr . |
| 5,065,429 | 11/1991 | Lang . |
| 5,071,168 | 12/1991 | Shamos . |
| 5,084,819 | 1/1992 | Dewey et al. . |
| 5,193,855 | 3/1993 | Shamos . |
| 5,215,334 | 6/1993 | Presson et al. . |
| 5,233,655 | 8/1993 | Shapiro . |
| 5,283,422 | 2/1994 | Storch et al. ............................ 235/375 |
| 5,325,294 | 6/1994 | Keene . |
| 5,364,133 | 11/1994 | Hofer et al. . |
| 5,379,344 | 1/1995 | Larsson et al. . |
| 5,401,059 | 3/1995 | Ferrario . |
| 5,423,574 | 6/1995 | Forte-Pathroff . |

(List continued on next page.)

FOREIGN PATENT DOCUMENTS

| | | |
|---|---|---|
| 0267085 | 5/1988 | European Pat. Off. . |
| 0329497 | 8/1989 | European Pat. Off. . |
| 0207940 | 10/1985 | Japan . |
| 87/02160 | 4/1987 | WIPO . |
| 88/03294 | 5/1988 | WIPO . |

*Primary Examiner*—George Manuel
*Attorney, Agent, or Firm*—Fenwick & West LLP

[57] ABSTRACT

A casino management system and method generates bet guarantee coupons for individual patrons of a casino as a function on actual gaming losses during a selected time interval of gaming during the course of an entire trip to a casino spanning any number of days. The patron's individual gaming at various gaming machines is tracked as individual patron ratings, or periods of play, identifying the patron's wins, losses, and the casino's theoretical win. Patron ratings for each day of a trip are accumulated for each patron to form daily rating summaries. When a trip ends, trip rating summaries for the patron's wins, losses, and the casino's theoretical win are determined from the daily rating summaries. The various summaries are used to calculate a bet guarantee amount as the greater of the patron's actual losses during a specified time interval of play, a percentage of the patron's total trip loss, a percentage of the casino's theoretical win for the entire trip, or a fixed dollar amount. The bet guarantee amount is provided to the patron in the form of a bet guarantee coupon, which is encoded for tracking by the casino, and redeemable by the patron for cash, credit, or coin.

5 Claims, 5 Drawing Sheets

U.S. PATENT DOCUMENTS

| | | | |
|---|---|---|---|
| 5,427,832 | 6/1995 | Longtin . | |
| 5,429,361 | 7/1995 | Raven et al. | 463/29 |
| 5,446,265 | 8/1995 | McAllister . | |
| 5,450,491 | 9/1995 | McNair . | |
| 5,457,747 | 10/1995 | Drexler et al. . | |
| 5,471,533 | 11/1995 | Wang et al. . | |
| 5,498,034 | 3/1996 | Ford . | |
| 5,613,912 | 3/1997 | Slater | 463/25 |

BET GUARANTEE SYSTEM

RELATED APPLICATIONS

This patent application is related to U.S. patent application Ser. No. 08/680,208, filed in Jul. 11, 1996, and entitled "Patron Database Architecture", and to U.S. patent application Ser. No. 08/680,200, filed on Jul. 11, 1996 and entitled "National Customer Recognition," both of which are incorporated by reference herein; all applications are assigned to a common assignee.

BACKGROUND

1. Field of Invention

The present invention relates to systems and methods for casino management and, more particularly, to systems and methods of data processing patron gambling data to provide a guarantee of a patron's bets.

2. Background of Invention

Gambling is an inherently risky activity. Casinos and other gambling establishments compete for the attention and gambling dollars of patrons. In order to make a particular gambling establishment attractive, casinos frequently provide different types of promotions and compensation packages to award patrons who frequent the casino and gamble in various amounts. Such promotions typically include discounts on rooms, shows, and other services or goods. These various promotional offers are well known and offer very little new inducement to patrons to gamble at one casino instead of another.

One type of inducement that is common is the provision of a certain amount of subsidy or "free play." This is typically done by giving a patron a specified number of chips or coins which the patron may play at his discretion. The number of chips supplied is determined ahead of time, typically as part of an overall promotional package. In some instances the number of chips may be determined based on an individual patron's previous gambling expenditures. In either case, once the patron exhausts the supplied chips, he is expected to continue gambling with his own funds. However, because the amount of chips or coins is essentially fixed ahead of time, there is no adjustment or compensation for the patron's actual gambling losses of their own funds during particular time intervals of play.

Electronic tracking of patron betting activity at gaming machines is also known in the art. Conventional systems already include the use of patron identification cards which are inserted into card readers attached to slot machines and other gaming machines. The gaming machines are adapted to record patron bets paid into the machine, and amounts paid out. This information is used to provide a variation of the subsidy-type promotion, with the patron again being provided with free credits, cash, coins, room discounts, and so forth based on the overall amounts bet by the patron. These types of systems do not provide guaranteed promotional compensation based on the patron's gambling losses during specified time intervals of play.

Accordingly, it is desirable to provide a system and method of casino management that guarantees a minimum amount of a patron's gambling losses. In particular, it is desirable to provide a casino management system that guarantees some portion of patron's bets and thereby the patron's losses, occurring in a selected time interval of play during an entire trip to the casino lasting any number of days.

SUMMARY OF THE INVENTION

In accordance with one aspect of the present invention, there is provided a casino management system that provides a guarantee of a portion of an individual patron's betting losses during a trip to a casino. The casino management system includes a database management system that tracks a patron's gambling activity during a trip to a casino. During such a trip, which may last any number of days, the patron may gamble at any number of gaming machines, such as slot machines, blackjack tables, or the like, meeting predetermined criteria, such as type and denomination. Patron bet tracking is done using identity cards issued to the patrons, each identity card encoded with patron information including an account number. Individual gaming machines are fitted with card readers that read the identity card. The casino management system tracks the patron's betting at each gaming machine between each insertion and removal of the identity card; this period is known as a "rating." For each rating generated, information including the amount the patron won or lost, the amounts bet, and the theoretical win of the casino during the rating is tracked. The theoretical win of the casino is based on the total amount of the patron's bet and the hold percentage of the gaming machine. During the course of a day a patron may have many ratings at various gaming machines, and thus over a course of the trip, there will be an even larger number of ratings.

Individual ratings for a patron are accumulated for each day of a trip to form daily rating summaries, including the total amounts won or lost by the patron, and the total theoretical win. A trip is defined, for example, as any number of days of play followed by a period of no gaming activity. A trip rating summary for the entire trip is also generated, indicating the patron's total win or loss, and the casino's total theoretical win with respect to the patron for the trip.

Once a trip is terminated, the casino management system determines the amount of the patron's bet guarantee based on the patron's actual wins and losses for a trip. Generally, any variety of loss measures may be used to determine the patron's losses from which the bet guarantee is determined. The bet guarantee is based on the patron's loss during a selected time interval during the trip, and optionally on the patron's total loss over the entire trip, or on the casino's theoretical win for the trip.

In one embodiment, the bet guarantee is determined by the casino management system as the greater of 1) the patron's actual loss during the first hour (or other time interval) of play; 2) a percentage of the casino's total trip theoretical win for that patron; 3) a percentage of the patron's actual losses during the trip, or 4) an arbitrary dollar amount. The actual loss during the first hour of play is determined from the patron's ratings (prorated if necessary) during that first hour. Other time intervals may also be used, as desired. Should the patron finish the first hour with winnings or only minor losses, the patron is still able to receive the bet guarantee, which is then based on his overall loss (if any) during the entire trip, with the bet guarantee being the greater of a percentage of the trip theoretical win of the casino, or a percentage of the patron's actual losses during the entire trip. Both of these values are determined by accumulation of ratings data from individual gaming machines over each day of the trip and over the trip as a whole.

Following determination of the bet guarantee amount, this information, along with patron identification information, such as name, address, and so forth, is merged with promotional data and form letters to create a promotional mailer that includes a bet guarantee coupon redeemable by the patron at the casino for the amount of the bet guarantee. The patron brings the bet guarantee coupon to the casino which then provides the bet guarantee amount specified on the coupon to the patron in the form of cash, chips, or credit. Each promotional mailer and bet guarantee coupon is uniquely numbered and bar coded, and associated with the patron account information. This allows the casino management system to track redemption rates and amounts, and to generate system reports on the overall number and amounts of bet guarantees provided, the number and amount reimbursed, and other information for evaluating the efficacy of the bet guarantee system implementation.

DETAILED DESCRIPTION OF THE INVENTION

Overview of the System Architecture

Figure 1:
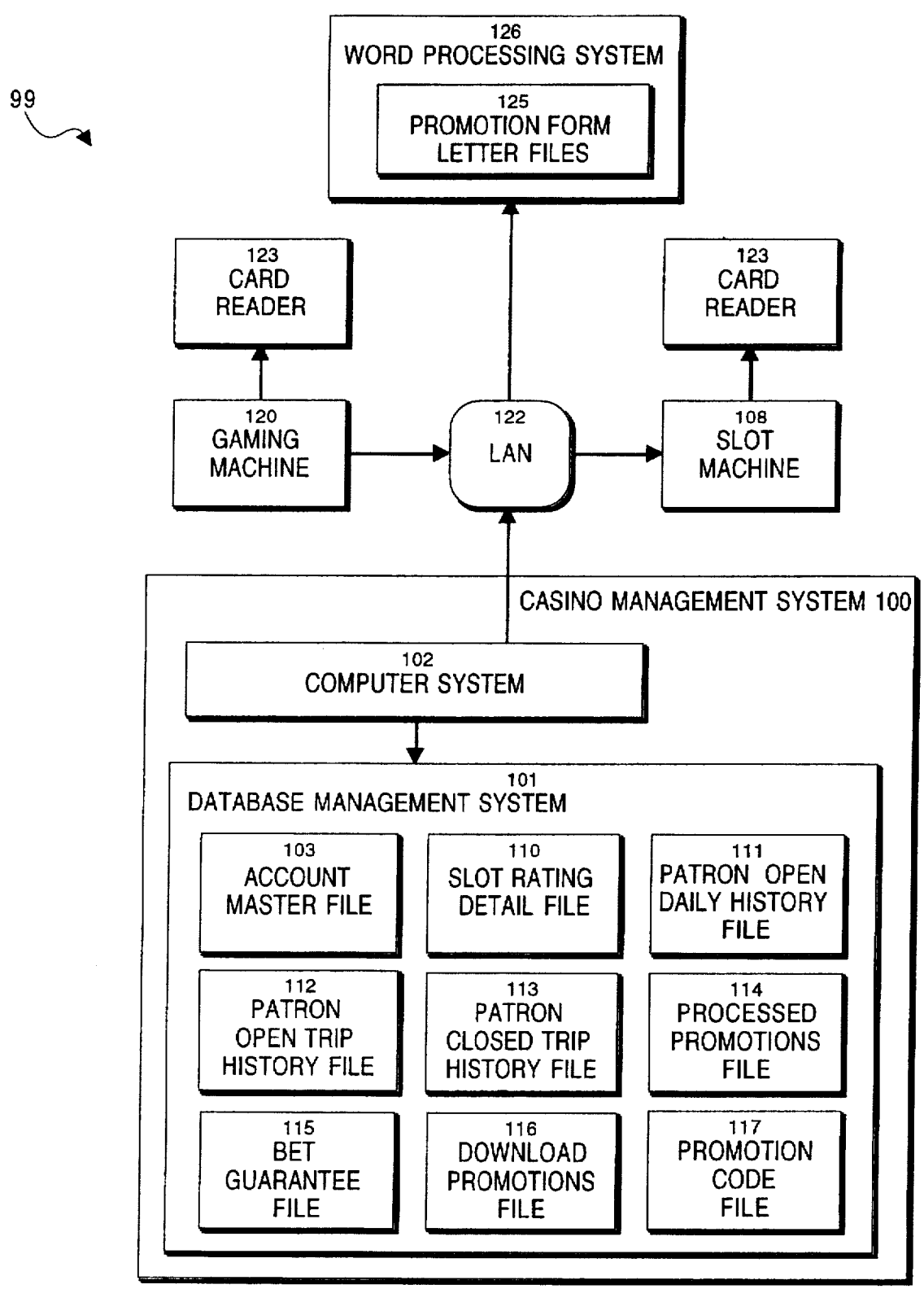
FIG. 1 is an illustration of a casino management system in accordance with the present invention.

Referring now to FIG. 1, there is shown a block diagram of a system in accordance with the present invention. System 99 includes a casino management system 100, including a computer system 102 and a database management system 101, a word processing system 126, and a plurality of slot machines 108 and other gaming machines 120 (one of each shown for convenience) and associated card readers 123 coupled to the casino management system 100 by a local area network (LAN) 122.

Casino management system 100 includes a computer system 102 and a database management system 101. Computer system 102 may be implemented with a high performance computer system capable of processing many thousands of transactions per hour. In one embodiment, the computer system is an IBM AS/400 computer system operating with a suitable operating system, such as OS/400. LAN 122 may be implemented using IBM's System Network Architecture (SNA), and network protocol such as SNA LU6.2. LAN 122 is preferably a token ring or ethernet network, and uses TCP/IP as a communications protocol. One suitable implementation of the computer system 102 and LAN 122 is described in the "Patron Database Architecture" application referenced above. The word processing system 126 stores promotion form letter files 125 which are word processing form letters for promotional mailers, one or more of which is a promotional mailer form letter including a redeemable bet guarantee coupon used to provide a patron with a coupon in the amount of a bet guarantee generated during a visit to the casino. The word processing system 126 may be implemented using a conventional personal computer, high speed printer, and network interface to LAN 112. The word processing system 126 merges data files received from the casino management system 100 identifying patrons who are to receive the bet guarantee promotional mailer with the appropriate word processing form letter 125 to create the promotional mailer and batch prints these promotional mailers.

Coupled to the computer system 102 are numerous slot machines 108 and other gaming machines 120. These various devices each include a card reader 123 into which a patron inserts an identity card encoded with an account number. Insertion of the card initiates tracking of the patron's gaming at the slot machine 108 or gaming machine 120, including the date, time, number and amounts of coins input, number of plays (e.g. handle pulls) and wins and losses, as further described below. In a preferred embodiment, the card readers 123 communicate with the LAN 122 through an intermediate computer system (not shown) such as an IBM RS 6000 which communicates the data files to the AS/400 over the LAN 122 using a bi-sync communication file. The card readers 123 may be implemented using Magtek card readers, coupled to Open Technologies Transceiver Boxes and using Open Technologies Master Repeaters and individual Repeaters for wireless data communication to the LAN 122.

For the ease of description, the present invention is described with reference to the slot machines 108 and patron gaming at such machines. The bet guarantee determination and amount is described with respect to betting, wins, losses and theoretical wins for the slot machines 108. Those of skill in the art will understand that the system and operations of the present invention may be readily extended to other types of gaming machines 120, and the bet guarantee provided based on any other specific type of gaming (e.g. blackjack, craps, and the like), or on total gaming by the patron for all types of gaming devices including slot machines 108, blackjack, and so forth, meeting various predetermined criteria such as type of gaming and denomination. The decision as to which type of gaming device to provide the bet guarantee is considered an implementation detail of the present invention.

Casino management system 100 includes a database management system 101. Database management system 101 may be implemented using supporting software for the AS/400 system, such as IBM's DB2/400 database management software. File definitions and schemas are defined using IBM's DDS (Data Description Specification) data definition language, and file access and manipulation is done with RPG (Report Program Generator) data manipulation language. In accordance with the present invention, database management system 101 persistently stores an Account Master File 103, a Slot Rating Detail File 110, a Patron Open Daily History File 111, a Patron Open Trip History File 112, a Patron Closed Trip History File 113, a Processed Promotions Files 114, a Bet Guarantee File 115, a Download Promotions File 116, and a Promotion Code File 117. Exemplary file definitions for these files are provided in Appendix A, below. Reference will be made to file and field names listed in Appendix A where useful for clarity of description. It is understood that the file definitions, including field names, byte formats, and so forth, are merely illustrative, and those of skill in the art would readily determine alternate file definitions individually, and relationships of files overall that would operate in accordance with the present invention to provide a bet guarantee system.

The Account Master File 103 (File: CMPMS in Appendix A) stores detailed information describing and identifying each patron who is entered into the casino management system 100 as a patron of the casino. For each patron a record is established including name, address, driver's license information, employer information, and so forth. Other useful information for evaluating the patron's betting activity may be stored, such as credit card information, credit limits including highest credit limit, trip credit limits, betting activity information, marker information, and check cashing information. Each patron is assigned a unique patron account number (field CMSID). This account number is used to identify the patron throughout the database (the field name of the account number varies between the files listed in Appendix A, but the underlying account number is the same). Each patron is also issued an identity card which is encoded with the account number, and if desired, other information about the patron's account, such as credit limits, and so forth.

When a patron inserts the identity card into a card reader 123 for a slot machine 108 and proceeds to play, the slot machine 108 gathers detailed information about the gaming activity, allowing the casino management system 100 to track the gaming activity of the patron. When the identity card is removed from the slot machine 108, the information gathered is then transferred to the casino management system 100 over the LAN 122. The gaming information gathered at the slot machine 108 between the card-in and card-out of the identity card constitutes a single "rating," which is recorded in the Slot Rating Detail File 110 (File: CSPRD). Each record therein includes the patron's account number (field SYIDRD), the date and time of the rating, the duration of the rating (field LOPSRD), the denomination of the slot machine 108 (field DVALRD), the dollar amount of coin entered into the machine by the patron (field CNI$RD), the dollar amount won or lost (field SWLSRD), and the theoretical win for the casino (field TCLCRD). In one embodiment, the theoretical win is calculated by multiplying the amount of coin in by the percentage of coin in that the slot machine will "hold" on average, which is the casino's win percentage for that machine (field HLDPRD). The theoretical win is optionally used to determine the amount of the bet guarantee provided to the patron following the completion of the patron's trip to the casino. Note that in other embodiments of the invention where other gaming devices are used (e.g. blackjack tables) a suitable file definition for tracking bets, wins, losses, and theoretical win of the casino would be used for such devices in a manner similar to the Slot Rating Detail File 110.

The Patron Open Daily History File 111 (File: CMPHD) stores a daily rating summary for ratings generated during a day for slot machines 108 or other gaming machines 120. A day may be arbitrarily defined, but typically is a 24 hour period. Each record in the Patron Open Daily History File 111 is derived from individual ratings generated during the day. Each record includes the patron's account number (field SYIDHD) for accessing the data of the record. Each file includes the date of play (field KYDTHD), average bet (field AVGBHD), and total bets made (field TBETHD). For each day, three theoretical win totals are stored: a slot theoretical win (field SCLCHD) for slot machines 108, a game theoretical win (field GCLCHD) for any other type of gaming machine 120, and a total theoretical win (field TCLCHD) for all gaming devices including slot machines 108 and other gaming machines 120. The slot total theoretical win is the total of the individual slot theoretical wins for each rating for the patron for the day, and thereby represents the theoretical amount the casino should have won from the patron given the hold percentages on each of the slot machines 108 played. Storing each type of daily total theoretical win enables the bet guarantee system to be flexibly adapted to provide for various types of bet guarantees, such as those targeted at slot machines 108 only, at various other types of games, or for all gaming by a patron.

The Patron Open Trip History File 112 (File: CMPHO) is updated from the Patron Open Daily History File 111 only a daily basis, and stores a trip rating summary for a patron's trip. A trip for a player is defined as any number of days of gaming activity terminated by a period of no gaming activity for the player. In the preferred embodiment, the period of no gaming activity is 24 hours following the close of a business day (6 a.m.) for the casino. For example, if a patron's last card-out from a slot machine 108 (or other gaming machine 120) occurs on a Monday at 5 p.m., then the casino management system 100 deems the trip closed as of 6 a.m. Wednesday morning.

Each record of the Patron Open Trip History File 112 includes the patron's account number (field SYIDHO), the beginning and ending dates of the trip, totals for the patron's wins and losses, including total slot wins and losses (field SWLSHC), and the patron's total dollars won or lost (field WIN$HO), along with a slot total theoretical win for the entire trip (field SCLCHC), game theoretical win (field GCLCHO), and total theoretical win for all games and slots played during the trip (field TCLCHO). Each record also includes a unique key date and key time (fields KYDTHO and KYTMHO) which may be used to quickly identify and retrieve individual records, from matching key dates and times in the Patron Open Daily History File 111.

The Patron Closed Trip History File 113 (File: CMPHC) is effectively identical in definition to the Patron Open Trip History File 112 but is used to store the trip data after a trip has been terminated by a player. Whereas the Patron Open Trip History File 112 contains at most one record for the open trip of a patron, the Patron Closed Trip History File 113 contains a record for each closed trip of the patron. Separation of the trip records into two distinct files by open and closed trips for each patron has been found to be a more efficient implementation then combining both open and closed trips into a single file.

Promotion Code File 117 (File: CMPPC) is used to define a number of different promotions being run by the casino and to track the efficacy of such promotions. Each promotion has a unique promotion code (field PRMOPC), and an expiration date (field #DAYPC) defining the number of days the promotion is valid from the time the patron receives a promotional mailing for the promotion. Each promotion is also associated with one of the form letters 125 by a print type (field PRTPC). When used in this system, one or more of the promotions defined therein is a promotion incorporating the bet guarantee, and the player receives a promotional mailer with a redeemable bet guarantee coupon in the amount of the bet guarantee determined from a previous trip to the casino. The expiration date is used to define how long the patron has to redeem the coupon. In one embodiment, there are different promotion codes assigned to the bet guarantee coupons and mailers for each different type of bet guarantee being provided (e.g. first hour of loss, percentage of total trip loss, and so forth). Distinct promotional codes for the bet guarantees for different types of games (e.g. slots, blackjack, and the like) may also be used. These codes allow the casino management system 100 to track the bet guarantee system at any level of detail. The same or distinct form letters may be used for these various promotion codes. In another embodiment, there is a single promotion code assigned to all promotional mailers including the bet guarantee coupon.

The Download Promotion File 116 (File: CMPWUP) is used to generate the promotional mailers which provide the patrons with the redeemable bet guarantee coupons in the amount of the bet guarantee they have individually earned. Each record in the Download Promotions File 116 describes a patron, a promotional mailer for the bet guarantee by promotion code (field PRMOUP), and print type (field PRTTUP), and the bet guarantee amount (field CN$OUP). These records are then merged with a word processing form letter 125 for the promotional mailer to generate the actual mailers and the bet guarantee coupons.

The Processed Promotions Files 114 (File: CMPPP) is used to track all promotional mailers and bet guarantee coupons that have been issued to patrons. Each record includes the patron's account number (field SYIDPP), a unique promotional number (field PRM#PP) which is bar coded on the bet guarantee coupon to identify the bet guarantee coupon when it is bar coded on the bet the amount of the bet guarantee (field AMT#PP), the amount redeemed the patron (field AMTRPP), the expiration date of the bet guarantee coupon (field EXHDPP), and other tracking data. This file is updated each time a new promotional mailer and bet guarantee coupon is generated by the casino management system 100 for a patron, and each time a bet guarantee coupon is redeemed.

The Bet Guarantee File 115 (File: CMPHH) is used to track the trips by a patron to the casino resulting from the promotional mailer and bet guarantee coupon that they initially earned from a first trip to the casino. Each record identifies the patron by account number (field SYIDHH), the number of trips to the casino (field #TR3HH), an active code field (field ACTHH) which indicates whether the player has qualified for the bet guarantee (A=active), failed to qualify (F=inactive), or completed five trips since the original trip made to obtain the bet guarantee (C=completed all trips), and five trip promotion code fields (fields COD1HH to COD5HH). Each trip promotion code field indicates the promotion code for the promotion the patron is using on each trip, with the first trip promotion code indicating the type of the bet guarantee coupon being redeemed.

System Operation

Figure 2:
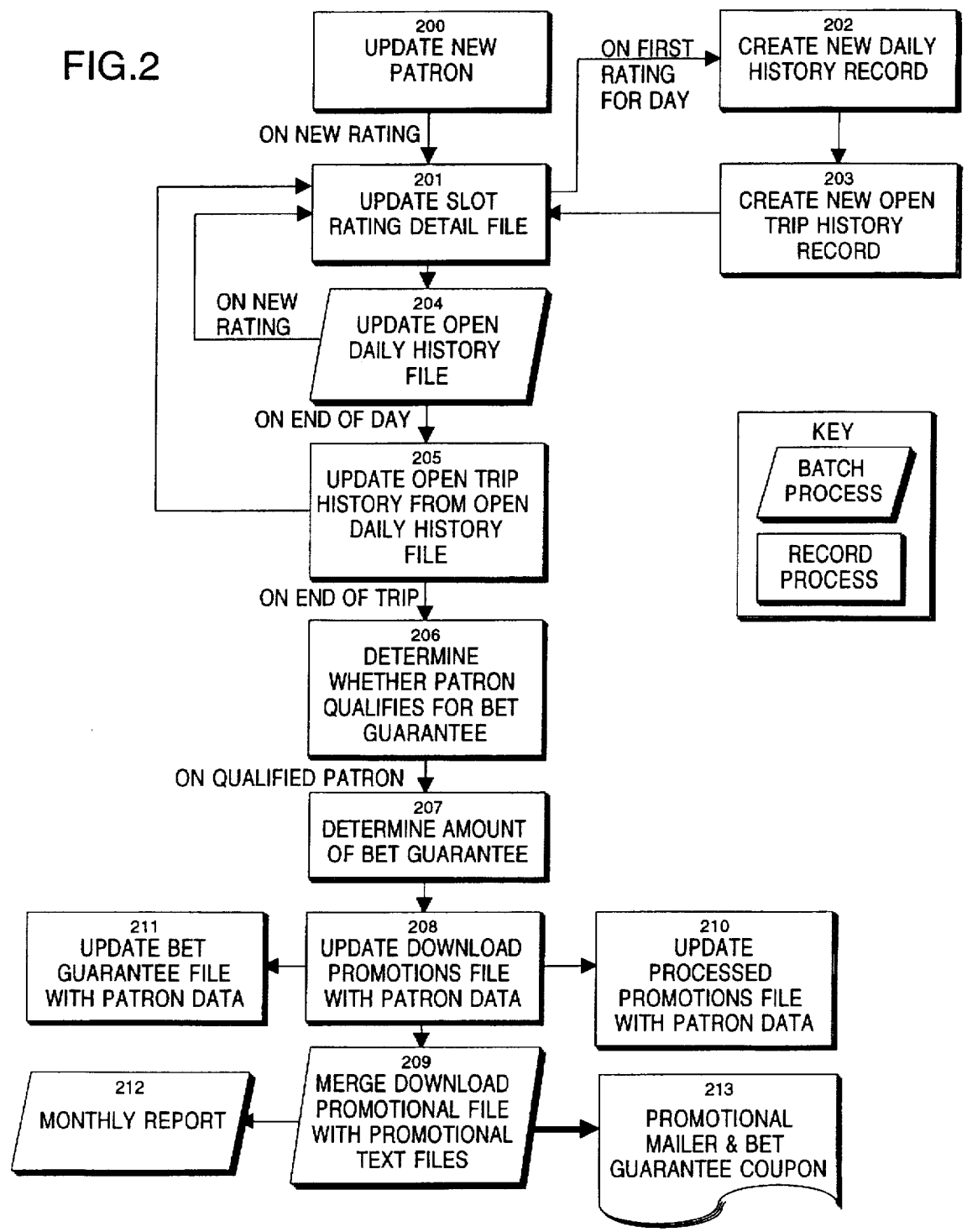
FIG. 2 is a flowgraph of the overall operation of the casino management system.

Referring generally now to FIG. 2, there is shown a flow diagram of the overall operation of the casino management system 100 in accordance with the present invention to provide a bet guarantee to any number of individual patrons in the casino.

The operation of the casino management system 100 may be understood from the initiation 200 of a new record for a new patron. Generally, a patron signs up to become a member of the casino's various promotional and awards programs. A new record is created in Account Master File 103 for the patron, and various data items are recorded for the patron, as described above for this file. In particular, an account number is assigned to the patron's account. The patron is issued an identity card which is a conventional mag-stripe card encoded with at least the patron's account number. The identity card is designed to be read by the card readers 123 associated with each of the slot machines 108 and other gaming machines 120 in the casino.

Each time the patron inserts the identity card into a card reader 123 of a slot machine 108, the slot machine 108 or other gaming machine 120 stores data for a single rating, the period of gaming at the machine between the card-in and card-out. The stored data preferably includes the patron's account number from the identity card, the time and date of the card-in (and card-out upon removal), the number and amount of coins or chips bet by the patron, the number and amount of coins paid out by the machine, the number of games played (e.g. handle pulls), and the denomination of the machine. Each slot machine 108 also stores descriptive data in an internal memory, including the hold percentage of the machine which is used to calculate the casino's theoretical win on the individual rating of the patron.

In the preferred embodiment, not all slot machines 108 in the casino are suitable for generating a bet guarantee of losses on the machine; rather only slot machines 108 of a predefined range of bet denominations (e.g. $5 or less slots) are acceptable.

When the patron removes the identity card from the slot machine 108, the slot machine 108 generates a message and transmits the player's rating data to the casino management system 100 over the LAN 122. Upon receipt of the first slot rating for a patron on a given day, the casino management system 100 updates 201 the Slot Rating Detail File 110 with a new record for the patron, identifying the patron by account number (field SYIDRD), and establishing values for the date (field BGHDRD), time (field BGTMRD), amounts put in (field CNI$RD) and paid out (field CNO$RD). Total win and loss data (field SWLSRD) is determined from the difference between amounts put in and paid out. The slot rating detail record also includes the denomination of the machine (field DVALRD), and its hold percentage (field HLDPRD). From the hold percentage and the amount put in by the patron, the casino management system 100 determines the casino's theoretical win for this individual rating (field TCLCRD) as the product of these two values.

For the first rating of a patron on a given day, the casino management system 100 creates 202 a new record for the patron in the Patron Open Daily History File 111. A patron has an open daily history record for each day of gaming activity during a trip. This record contains a summary of the detailed rating activity (for slot machines and any other gaming machines or activity), including the dollar amount won/lost (field SWLSHD) on slot machines and all games (field WIN$HD), and the total theoretical win for slots (field SCLCHD) which is the summed value over the individual slot rating detail record's theoretical win. The casino management system 100 will also create 203 a new record for the patron in the Patron Open Trip History File 112, if one does not already exist for the current trip, as defined above, using the patron information.

Each time slot rating from a slot machine 108 is posted to the Slot Rating Detail File 110, the information is also updated 204 to the daily history record for the patron in the Patron Open Daily History File 111. The slot rating information, however, is not added to the Patron Open Trip History File 112 at this time.

Figure 3:
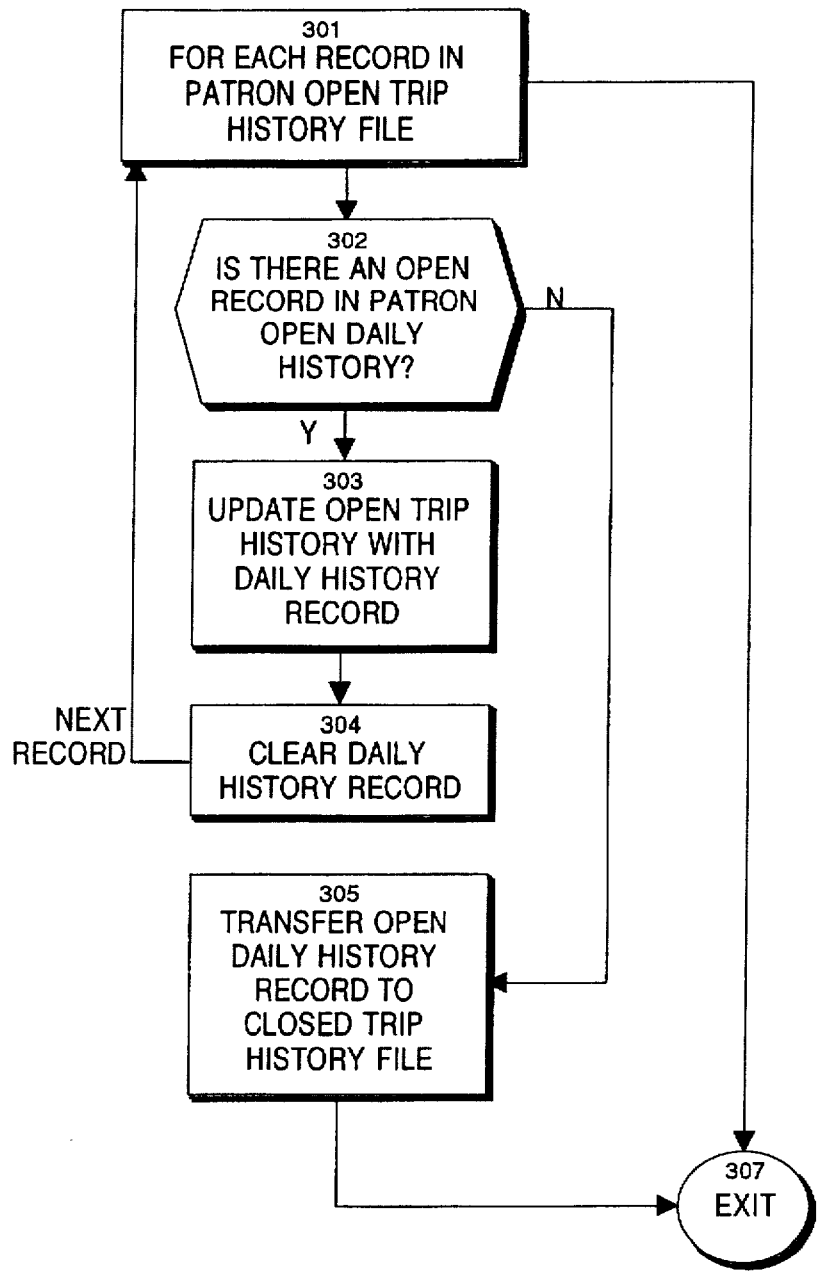
FIG. 3 is a flowgraph of the process of updating open trip history information for a patron.

In a daily batch process at the end of each business day, the casino management system 100 updates 205 the Patron Open Trip History File 112. Referring now to FIG. 3, there is shown a flowgraph of the process of updating 205 the Patron Open Trip History File 112. The casino management system 100 evaluates 301 each record in the Patron Open Trip History File 112, and determines 302 if there are any corresponding daily history files in the Patron Open Daily History File 111 for the patron. More particularly, for each record in the Patron Open Trip History File 112, the casino management system 100 uses the patron account number to identify a record in the Patron Open Daily History File 111. If an open daily history record is located for the patron, the information therefrom is updated 303 to the open trip history record for that patron. In particular, the casino management system 100 updates a total slot theoretical win (field SCLCHO) using the theoretical win from the daily history record (field SCLCHD in file CMPHD), and total slot win/loss (field SWLSHO). The game and total overall theoretical win, and win/loss is also updated. Other daily information, as illustratively shown in the file definition for the Patron Open Trip History File 112, may also be updated or summarized at this point.

The casino management system 100 then clears 304 the open daily history record for that patron. If no open daily history record for the patron is found, this indicates that the patron has not made any plays for an entire day. Accordingly, casino management system 100 transfers 305 the open trip history record for the patron in the Patron Open Trip History File 112 to the Patron Closed Trip History File 113, thereby closing the patron's trip.

Figure 4:
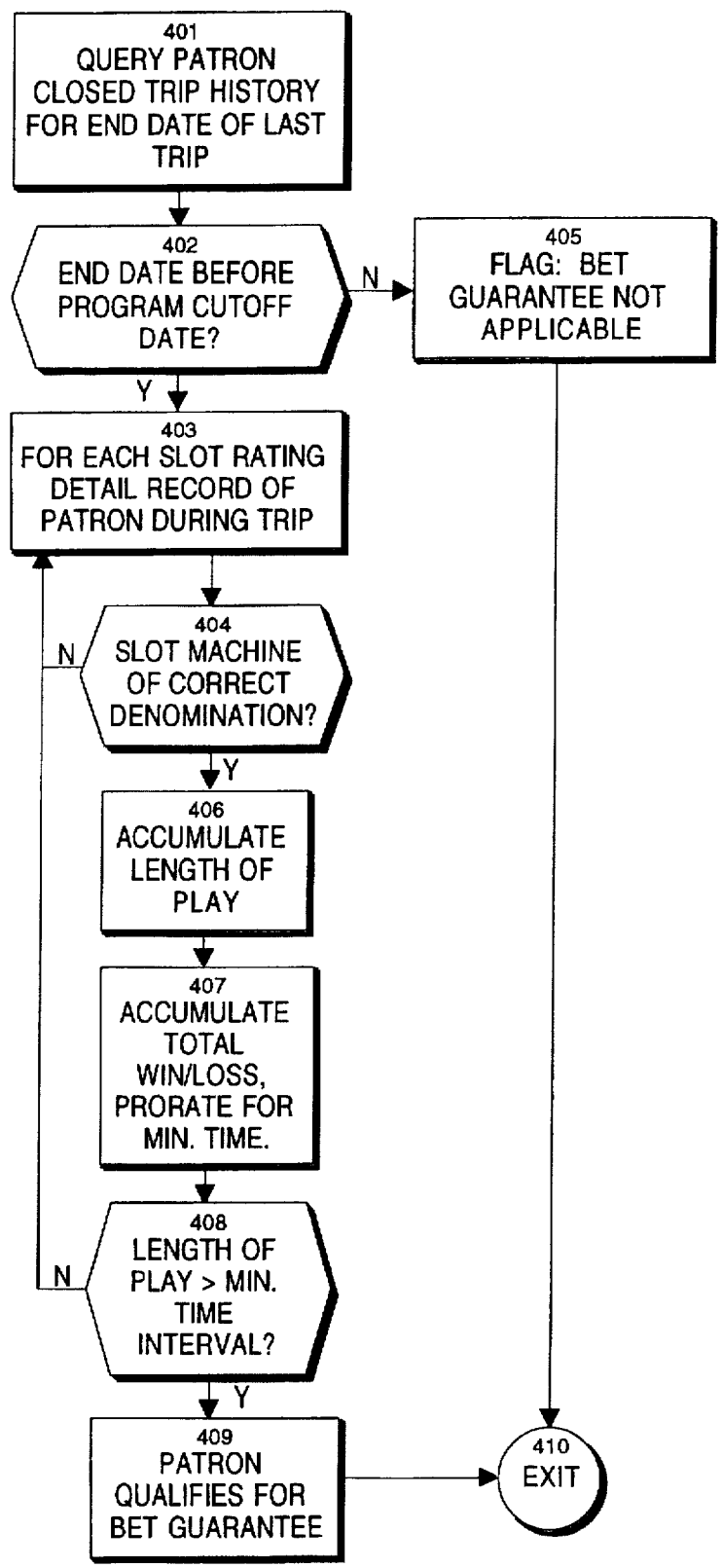
FIG. 4 is a flowgraph of the process of determining whether a patron qualifies for a bet guarantee.

Referring generally to FIG. 2 again, at the time that the patron's trip closes, the casino management system 100 determines 206 whether the patron has qualified to receive the bet guarantee for his betting activity during the trip. FIG. 4 illustrates a flowgraph for a process of determining whether a patron qualifies for the bet guarantee by the casino management system 100. In one embodiment, various requirements are imposed on the patron in order to qualify for the bet guarantee. These requirements are aimed at encouraging "new" patrons to gamble at the casino, rather than incenting frequent patrons. Thus, in one embodiment, in order to qualify for the bet guarantee, the patron must not have any gaming activity at the casino between a specified date (e.g. within the past year) and the current trip. This limitation is enforced by querying 401 the Patron Closed Trip History File 113 with the patron account number (field SYIDHC) to obtain the trip record for the last previous trip of the patron, and verifying 403 that the trip end date (field ENHDHC) for this last trip was before the specified date. If the patron's last trip was after the specified date, then the casino management system 100 returns 405 a signal that the patron is not eligible for the bet guarantee. In other embodiments, this time limitation need not be imposed, and the bet guarantee made available to all patrons regardless of the frequency or recency with which they visit the casino.

As another requirement to qualify for the bet guarantee, the casino management system 100 determines whether the patron has played at specified denomination slot machines 108 for a minimum time interval during the trip. In the preferred embodiment, the patron must play at $5 or lesser slot machines 108 for at least 50 minutes. This criteria is enforced by reading 403 the patron's Slot Rating Detail records for the trip, using the patron's account number (field SYIDRD in file CSPRD), determining 404 whether the slot machine 108 is of the appropriate denomination (field DVALRD). If so, the casino management system 100 sums 406 the length of play of the rating (field LOPSRD) from the record with a running total. The total win/loss at the slot machine is also accumulated 407 (field SWLSRD) for these records. This accumulation of slot time and total win/loss is repeated until the total time played equals or exceeds (408) the minimum time interval for play. If the rating that makes the total length of play reach the minimum causes the total time played to exceed the minimum, then the total win/loss in this rating is prorated to include only the percentage of the rating duration that would bring the total time played to exactly the minimum time interval. For example, assume three ratings of a patron, 15, 30, and 30 minutes long, respectively. Further assume that the minimum time interval of play is 1 hour. Only the first 15 minutes of the last 30 minute rating is necessary to meet the 1 hour minimum of play. Accordingly, the total win/loss for this rating is prorated by 50% when added to the accumulated win/loss of the previous ratings.

If the various requirements are met, the patron qualifies 409 for the bet guarantee promotion. The casino management system 100 then determines 207 (FIG. 2) the value of the bet guarantee. Generally, unlike conventional promotional compensation plans, the bet guarantee is designed to compensate the patron for his actual losses during at least some fixed time interval of play.

To provide a flexible bet guarantee, the present invention provides a variety of bet guarantee values. The bet guarantee preferably includes a guarantee of the patron's actual losses during a selected time interval of play during the trip. This bet guarantee is preferably at least 100% of such losses, if any, subject to a maximum value. The bet guarantee may also be based on other loss measures. The selected time interval may be the first hour (or longer/shorter) of play, are any other fixed time interval during the patron's trip.

In one embodiment, the patron receives the greater of (1) the total loss recorded during the minimum time period of rated play at specified denomination slot machines (subject to a maximum), (2) a percentage (e.g. 10–20%) of the total trip theoretical loss, (3) a percentage (e.g. 4–8%) of the total trip actual loss, or (4) a fixed dollar amount (e.g. $10). Having a variety of bet guarantee options provides a valuable incentive to the patron to patronize the casino since the patron will actually be compensated for whichever determination of loss is greatest. Again, as noted above, these amounts can be based on theoretical win rates from just slot machines 108, other gaming machines 108, total gaming, or any desired combination of gaming machines and devices. In addition, the minimum time interval may be any fixed time interval during the patron's trip.

Figure 5:
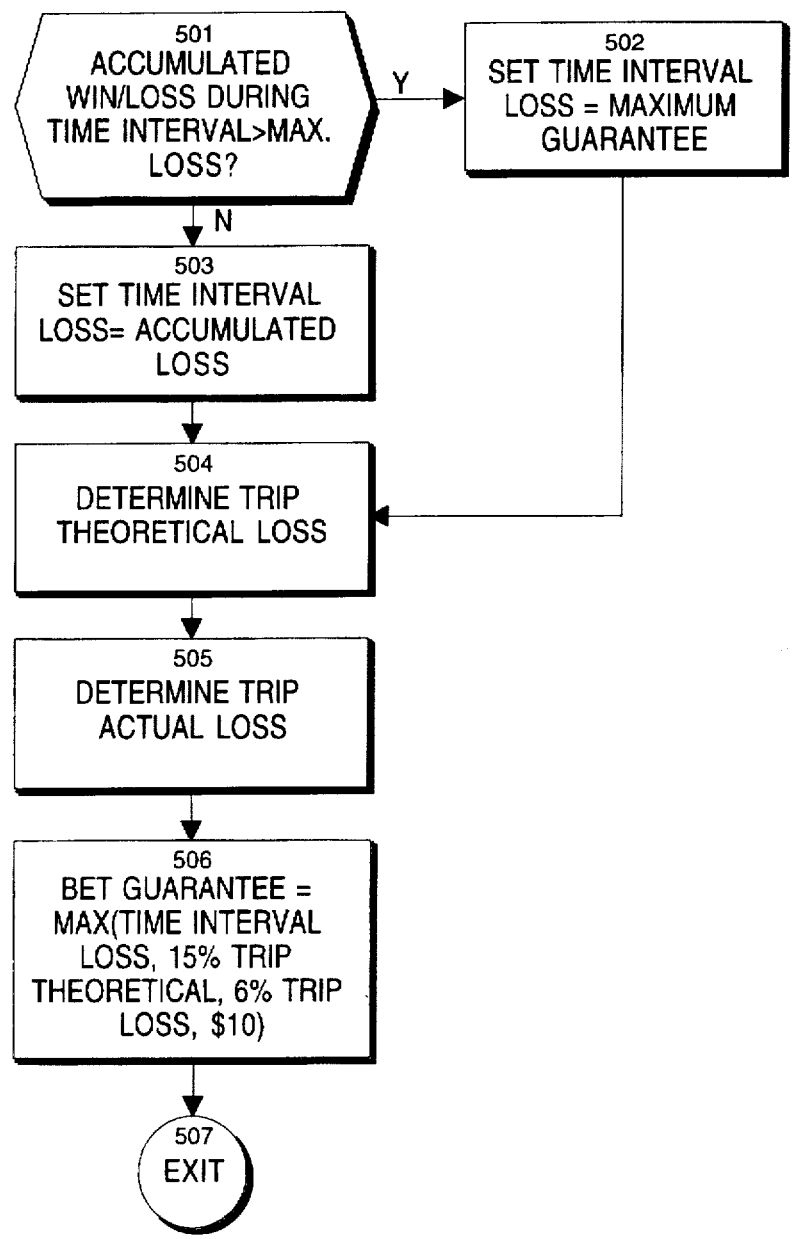
FIG. 5 is a flowgraph of the process of determining a bet guarantee amount.

Referring to FIG. 5, there is shown a flowgraph for one process of determining the bet guarantee amount. The casino management system 100 compares 501 the accumulated sum of the appropriate gaming win/loss from the selected time interval with a specified maximum loss amount (e.g. $250). If the accumulated loss is greater than the maximum, then the loss for the selected time interval is set 502 at the specified maximum value. If the accumulated win/loss during the selected time interval is less than the maximum, or results in a patron win, then the time interval loss is set 503 at the accumulated value.

The casino management system 100 extracts 504 the appropriate trip theoretical loss for the patron from the Patron Closed Trip History File 113 using the patron's account number (field SYIDHC). For slots, this value is the slot theoretical total win (field SCLCHC). The casino management system 100 also determines 505 the appropriate trip actual loss (field SWLSHC for slots). In the preferred embodiment, the bet guarantee is then set 506 at the greater of the time interval loss, 15% of the trip theoretical, 6% of the trip actual loss, or $10. Again, these calculations may be made with respect to losses and theoretical wins for other games, or total gaming (e.g. total loss in field WIN$HC, and total theoretical in field TCLCHC).

For example, assume that the patron's accumulated loss during the selected time interval is $250, while the maximum cap is $300. Further assume that instead of losing over the course of the trip, the patron has trip winnings of $2,000, while the trip theoretical win for the casino is $1,500. Then the time interval loss is set at $200. However, in the above embodiment, the bet guarantee amount is the greater of $250,–$120 (6% of trip loss), $225 (%15 of trip theoretical), or $10. Thus, the patron receives a bet guarantee of $250 even though the patron won $2,000 during the trip. Had the patron's trip theoretical win been more than $1,667, then the bet guarantee amount would have been based on this value, and would have been greater than $250.

Once the bet guarantee amount is determined it is necessary to provide the bet guarantee amount to the patron in a useful form. In the preferred embodiment, this is done by generating a promotional mailer that includes a redeemable bet guarantee coupon in the amount of the bet guarantee. The promotional mailer is sent to the patron who can bring the bet guarantee coupon to the casino on his next trip and redeem the coupon for cash, coins, or credit. In this embodiment, the bet guarantee acts as an inducement for the patron to further patronize the casino.

Referring to FIG. 2, once the amount of the bet guarantee has been determined, the casino management system 100 creates 208 a new record in the Download Promotions File 116 (File: CMPWUP) in preparation for downloading and eventual merging with a word processing form letter 125 to create the promotional mailers 213 for all patrons who are to receive a bet guarantee. This new record contains the patron account number (field SYIDUP), the name and address information for the patron (extracted from the Account Master File 103 using the patron's account number), the amount of the bet guarantee (field CN$OUP), a unique nine digit promotional number (field CNP#UP), an expiration date for the promotional offer (field EXHDUP), a print type denoting which form letter to use (field PRTTUP), and a promotion code (field PRMOUP) indicating which of the four bet guarantee values was used to determine the bet guarantee amount. The promotion code is determined at the time the bet guarantee amount is determined. The print type is then looked up in the Promotions Code File 117 (field PRTTPC in file CMPPC) using the promotion code. The promotional number is used to generate a bar code on the promotional mailer and bet guarantee coupon. This allows the casino management system 100 to track the specific bet guarantee coupon generated for this patron with the bet guarantee amount, and to determine rates and amount of redemptions by patrons during subsequent visits. The expiration date for the bet guarantee coupon is calculated by adding the number of valid days for the bet guarantee promotion (field #DAYPC in file CMPPC) to the current system date.

At the end of each business day, or other convenient period, the casino management system 100 downloads the Download Promotions File 116 to the word processing system 126, which merges 209 the Download Promotions File 116 with a promotion form letter 125 containing all relevant information about the promotional offer to generate the promotional mailer and redeemable bet guarantee coupon 213. The promotional mailer and bet guarantee coupon 213 include the dollar amount of the bet guarantee, the expiration date for redeeming the bet guarantee coupon, and the bar coded promotional number to be used at the time of redemption to identify the promotional mailer and bet guarantee coupon.

For each record added to the Download Promotion File 116, the casino management system 100 creates 210 a corresponding new record in the Processed Promotions File 114 (File: CMPPP). This record tracks the actual redemption of the promotional mailer and bet guarantee coupon by the patron, and thereby allows the casino management system 100 to determine redemption rates and amounts. The record contains the patron account number (field SYIDPP), the promotional number which is bar coded on the bet guarantee coupon (field PRM#PP), the amount of the bet guarantee (field AMT$PP), the promotional code (field PRMOPP) for the bet guarantee promotion, and the key date and key time of the Patron Closed Trip History File 113 record corresponding to the trip on which the bet guarantee coupon was redeemed (fields REKDPP and REKTPP, which key to fields KYDTHC and KYTMHC in file CMPHC). At a subsequent time when a patron redeems the bet guarantee coupon, the key date and time from the patron's current trip is entered into the redeemed key date and time fields in the patron's record in the Processed Promotions File 114. The patron is issued cash, coin, or credit in the amount specified on the bet guarantee coupon. Thus, the Processed Promotions File 114 stores all data necessary to determine which patrons have and have not redeemed their bet guarantee coupons.

In a monthly batch process 212, the casino management system 100 determines the efficacy of the bet guarantee promotion. The casino management system 100 summarizes the data in the Processed Promotions File 114 by each promotion code (field PRMOPP). This process produces a report stating for each promotion code, the total number of promotions issued, the total number of promotions, including bet guarantee coupons, redeemed, the total dollar amount issued, the total dollar amount redeemed, and the gaming activity generated during the trips on which the bet guarantee coupons were redeemed. The casino is thus able to evaluate the bet guarantee promotion system in comparison with any other promotions that may be offered.

In addition to updating 208 the Download Promotions File 116 with data for the bet guarantee of a patron, the casino management system 100 also updates 211 the Bet Guarantee File 115 with a new record for the patron and bet guarantee provided. The new record contains the patron account number (field SYIDHH), the date that the patron qualified for the get guarantee promotion (field BGHDHH), the patron's current status in the bet guarantee promotion (field ACTVHH), the number of trips that have occurred during the promotion (field #TR#HH), the promotion code assigned for each trip (fields COD1HH, COD2HH, COD3HH, and COD4HH), and the expiration date of the bet guarantee promotion (field OEHDHH). This file is used by the casino management system 100 to track the patron's subsequent trips occurring before expiration of the bet guarantee promotion, providing increasingly more lucrative promotional offers to the patron for each subsequent visit. At the conclusion of the bet guarantee promotion, this file is merged in the word processing system 126 with a promotion form letter 125 used to generate a closing letter thanking the patron for visiting the casino.

In summary, the present invention provides a flexible system and method for providing bet guarantees to patrons, while maintaining full accounting and administration control and analysis of the system. The present invention tracks and manages individual patron gaming, determines rating level, daily level, and trip level data for wins, losses, and theoretical wins. Using these multiple data sources, the present invention is thereby able to determine an appropriate bet guarantee amount based on patron losses during a selected time interval during a trip. The present invention provides for efficient management of bet guarantee data, including tracking of bet guarantee coupons and redemption rates thereof.

APPENDIX A

ACCOUNT MASTER FILE (File Field Description)

```
File   . . : CMPMS        Record format  . : CMRMS      Record length  . . :  796
Library . : CMLIBAFMA    Type of file . . : PF          Number of fields . . :  145

From    To     Size    Key    Field     Text
   1     4     7,0            CMSID     PATRON ACCOUNT NO
   5     8     7,0            CMBTMS    THE ACCOUNT NO. AN ACCOUNT WAS COMBINED TO
   9     9     1              SCDEMS    ACCOUNT STATUS
  10    10     1,0            CTYPMS    PATRON TYPE
  11    17     7              SCAPR     STATUS CHANGE APPROVED BY
  18    18     1              DTIND     DETAIL INDICATOR
  19    21     3              REPNO     REPRESENTATIVE NUMBER
  22    33    12              FNAME     ACCOUNT FIRST NAME
  34    34     1              MNAME     PATRONS MIDDLE INITIAL
  35    51    17              LNAME     ACCT LAST NAME
  52    63    12              SNAME     ACCT 2ND NAME
  64    88    25              SADDR     STREET ADDRESS
  89   113    25              CITY@     CITY
 114   116     3              STATE     STATE
 117   125     9              ZIPCD     ZIP CODE
 126   126     1              BADCMS    BAD ADDRESS   Y-YES
 127   128     3,0            DFBKMS    DEFAULT BANK
 129   133     9,0            SSNUM     SOCIAL SECURITY #
 134   134     1              SEX@@     PATRONS SEX  M-MALE,F-FEMALE
 135   140    10,0            HTELE     HOME PHONE NUMBER
 141   143     5,0            BDATE     100YR FORMAT PATRON'S BIRTHDATE
 144   147     6,0            BRTDT     BIRTHDATE
 148   149     3,0            HIGHT     HEIGHT - FEET/INCHES
 150   151     3,0            WIGHT     WEIGHT LBS.
 152   152     1,0            CEYES     COLOR OF EYES 1-BROWN 2-BLUE 3-GREEN 4-HAZ
 153   153     1              GLASS     GLASSES
 154   154     1,0            CHAIR     COLOR OF HAIR 1-BLOND 2-BLACK3-BROWN 4-GRA
 155   179    25              DLICN     DRIVERS LICENSE NUMBER
 180   182     3              DLSTA     DRV LICNS STATE
 183   184     2,0            DLMXP     DRV LICNS MTH OF EXP
 185   186     2,0            DLEXP     EXPIRATION YEAR OF DRIVER'S LICENSE
 187   187     1              MAILC     MAIL CODE - H-HOME, B-BUS. N-NONE
 188   191     6,0            ANVDT     ANNIVERSARY DATE
 192   195     6,0            SBDAT     SPOUSE'S BIRTHDATE
 196   201    11,0            CCNOMS    CENTRAL CREDIT NUMBER FOR ACCOUNT
 202   213    12              MFNMMS    MOTHER'S FIRST NAME
 214   230    17              MMLNMS    MOTHER'S MAIDEN NAME
 231   245    15              OCCUP     OCCUPATION
 246   260    15              FTYPE     TYPE OF BUSINESS
 261   285    25              FIRM@     EMPLOYER OR BUSINESS NAME
 286   310    25              FADDR     FIRM ADDRESS
 311   335    25              FCITY     FIRM CITY
 336   338     3              FSTAT     FIRM STATE
 339   347     9              FZIPC     FIRM ZIPCODE
 348   353    10,0            FTELE     BUS PHONE
```

*Case 2571*          -25-          *Bet Guarantee System*

| | | | | |
|---|---|---|---|---|
| 354 | 356 | 4,2 | LNEMP | LENGTH OF EMPLOYMENT |
| 357 | 357 | 1 | INDCD | INDUSTRY CODE |
| 358 | 359 | 2,0 | CMPNY | COMPANY NUMBER |
| 360 | 363 | 6,0 | CACCD | 100YR FORMAT CARD ACCEPTED DATE |
| 364 | 366 | 5,0 | CESTD | 100YR FORMAT ACCOUNT ESTABLISHED DATE |
| 367 | 373 | 7 | ENTRD | ENTERED BY |
| 374 | 377 | 7,0 | RQLIM | REQUESTED CREDIT LIMIT FOR ACCOUNT |
| 378 | 381 | 7,0 | ORLIM | ORIGINAL CREDIT LIMIT FOR ACCOUNT |
| 382 | 385 | 7,0 | HLIMMS | HIGHEST CREDIT LIMIT AMOUNT |
| 386 | 389 | 6,0 | HLDAT | DATE HIGHEST CREDIT LIMIT WAS ESTABLISHED |
| 390 | 394 | 9,2 | LOL$MS | LAST OVER LIMIT AMOUNT |
| 395 | 398 | 6,0 | LOLDMS | SYSTEM DATE OF LAST OVER LIMIT CASHED CHEC |
| 399 | 400 | 3,0 | DEDLY | DEPOSIT DELAY - NUM. OF DAYS |
| 401 | 407 | 7 | DEDAP | DEPOSIT DELAY APPROVED BY |
| 408 | 411 | 7,0 | CRLIM | CURRENT CREDIT LIMIT FOR ACCOUNT |
| 412 | 415 | 7,0 | TRLIM | LIMIT THIS TRIP - $ |
| 416 | 419 | 7,0 | PLIMMS | PREVIOUS LIMIT |
| 420 | 423 | 7,0 | PTLMMS | PREVIOUS TRIP LIMIT |
| 424 | 424 | 1 | LAPRMS | LIMIT APPROVAL REQUIRED?  Y-YES OR BLANK |
| 425 | 428 | 6,0 | CCD1MS | CURRENT CREDIT LIMIT DATE 1 |
| 429 | 435 | 7 | CCA1MS | CURRENT CREDIT LIMIT APPROVER ID 1 |
| 436 | 439 | 6,0 | CTD1MS | CURRENT TRIP LIMIT DATE 1 |
| 440 | 446 | 7 | CTA1MS | CURRENT TRIP LIMIT APPROVER ID 1 |
| 447 | 450 | 6,0 | PCD1MS | PREVIOUS CREDIT LIMIT DATE 1 |
| 451 | 457 | 7 | PCA1MS | PREVIOUS CREDIT LIMIT APPROVER ID 1 |
| 458 | 461 | 6,0 | PTD1MS | PREVIOUS TRIP LIMIT DATE 1 |
| 462 | 468 | 7 | PTA1MS | PREVIOUS TRIP LIMIT APPROVER ID 1 |
| 469 | 472 | 6,0 | CCD2MS | CURRENT CREDIT LIMIT DATE 2 |
| 473 | 479 | 7 | CCA2MS | CURRENT CREDIT LIMIT APPROVER ID 2 |
| 480 | 483 | 6,0 | CTD2MS | CURRENT TRIP LIMIT DATE 2 |
| 484 | 490 | 7 | CTA2MS | CURRENT TRIP LIMIT APPROVER ID 2 |
| 491 | 494 | 6,0 | PCD2MS | PREVIOUS CREDIT LIMIT DATE 2 |
| 495 | 501 | 7 | PCA2MS | PREVIOUS CREDIT LIMIT APPROVER ID 2 |
| 502 | 505 | 6,0 | PTD2MS | PREVIOUS TRIP LIMIT DATE 2 |
| 506 | 512 | 7 | PTA2MS | PREVIOUS TRIP LIMIT APPROVER ID 2 |
| 513 | 516 | 6,0 | CCD3MS | CURRENT CREDIT LIMIT DATE 3 |
| 517 | 523 | 7 | CCA3MS | CURRENT CREDIT LIMIT APPROVER ID 3 |
| 524 | 527 | 6,0 | CTD3MS | CURRENT TRIP LIMIT DATE 3 |
| 528 | 534 | 7 | CTA3MS | CURRENT TRIP LIMIT APPROVER ID 3 |
| 535 | 538 | 6,0 | PCD3MS | PREVIOUS CREDIT LIMIT DATE 3 |
| 539 | 545 | 7 | PCA3MS | PREVIOUS CREDIT LIMIT APPROVER ID 3 |
| 546 | 549 | 6,0 | PTD3MS | PREVIOUS TRIP LIMIT DATE 3 |
| 550 | 556 | 7 | PTA3MS | PREVIOUS TRIP LIMIT APPROVER ID 3 |
| 557 | 557 | 1 | STLMMS | STRICT LIMIT FLAG   Y-YES |
| 558 | 561 | 6,0 | STLDMS | STRICT LIM DATE |
| 562 | 568 | 7 | STLAMS | STR LIM APPRVD BY |
| 569 | 572 | 7,0 | HAC$MS | HIGH ACTION AMOUNT |
| 573 | 576 | 6,0 | HACDMS | SYSTEM DATE OF HIGH ACTION FOR ACCOUNT |
| 577 | 579 | 5,0 | LACTD | 100YR SYSTEM DATE OF LAST ACTIVITY FOR ACC |
| 580 | 582 | 5,0 | LCACD | 100YR SYSTEM DATE OF LAST CREDIT ACTIVITY |
| 583 | 585 | 4,0 | LCACT | LAST ACTIVITY TIME |
| 586 | 587 | 3,0 | CK#CMS | CURR # CHECKS CASHED |
| 588 | 592 | 9,2 | CK$CMS | CURR $ CHECKS CASHED |

Case 2571     -26-     Bet Guarantee System

| | | | | |
|---|---|---|---|---|
| 593 | 594 | 3,0 | MK#CMS | CURRENT NUMBER MARKERS |
| 595 | 599 | 9,2 | MK$CMS | CURRENT AMOUNT MARKERS |
| 600 | 604 | 9,2 | MC$CMS | CURRENT AMOUNT OF MARKERS IN CAGE |
| 605 | 609 | 9,2 | MP$CMS | CURRENT AMOUNT OF MARKERS IN PIT |
| 610 | 614 | 9,2 | MRTM$ | CURRENT AMOUNT RTMS |
| 615 | 619 | 9,2 | MINT$ | CURRENT AMOUNT IN-TRANSIT |
| 620 | 624 | 9,2 | MHLD$ | CURRENT AMOUNT HOLD |
| 625 | 629 | 9,2 | ALIM$ | AVAILABLE LIMIT FOR ACCOUNT - CURRENT OR T |
| 630 | 634 | 9,2 | MFIA$ | CURRENT AMT FIA |
| 635 | 639 | 9,2 | SK$1MS | CURRENT SAFEKEEPING AMOUNT 1 |
| 640 | 644 | 9,2 | SK$2MS | CURRENT SAFEKEEPING AMOUNT 2 |
| 645 | 649 | 9,2 | SK$3MS | CURRENT SAFEKEEPING AMOUNT 3 |
| 650 | 651 | 3,0 | CK#MMS | MONTH # CHECKS CASHED |
| 652 | 656 | 9,2 | CK$MMS | MONTH $ CHECKS CASHED |
| 657 | 658 | 3,0 | CK#YMS | YEAR # CHECKS CASHED |
| 659 | 663 | 9,2 | CK$YMS | YEAR $ CHECKS CASHED |
| 664 | 666 | 5,0 | CK#TMS | TOTAL # CHECKS CASHED |
| 667 | 672 | 11,2 | CK$TMS | TOTAL $ CHECKS CASHED |
| 673 | 674 | 3,0 | MK#MMS | MONTH NUMBER MARKERS |
| 675 | 679 | 9,2 | MK$MMS | MONTH AMOUNT MARKERS |
| 680 | 681 | 3,0 | MK#YMS | YEAR NUMBER MARKERS |
| 682 | 686 | 9,2 | MK$YMS | YEAR AMOUNT MARKERS |
| 687 | 689 | 5,0 | MK#TMS | TOTAL # MARKERS ISSUED |
| 690 | 695 | 11,2 | MK$TMS | TOTAL $ MARKERS ISSUED |
| 696 | 700 | 9,2 | WOF$MS | WRITEOFF AMOUNT |
| 701 | 704 | 6,0 | WOFDMS | DATE ACCOUNT WAS WRITTEN OFF |
| 705 | 706 | 3,0 | RTMS# | NBR OF RETURNS |
| 707 | 710 | 6,0 | LRTMD | SYSTEM DATE OF LAST RETURNED ITEM FOR ACCO |
| 711 | 713 | 5,0 | RTEXP | 100YR SYSTEM DATE WHEN ACCOUNT HOLD EXPIRE |
| 714 | 715 | 3,0 | RT#FMS | NUMBER OF FIRST TIME RETURNS |
| 716 | 720 | 9,2 | RT$FMS | AMOUNT OF FIRST TIME RETURNS |
| 721 | 724 | 6,0 | TRDTE | CALNDR TRIP DATE FOR ACCOUNT |
| 725 | 726 | 3,0 | TDAYMS | NUMBER OF DAYS FOR PATRON TRIP |
| 727 | 728 | 2,0 | IHOTMS | IN-HOTEL |
| 729 | 730 | 2,0 | ICSNMS | IN-CASINO |
| 731 | 732 | 2,0 | ALOCMS | PROPERTY NUMBER WHERE ACCOUNT IS ACTIVE |
| 733 | 739 | 7 | APITB | WHO ACTIVATED ACCOUNT IN PIT |
| 740 | 742 | 5,0 | APITD | 100YR SYSTEM DATE WHEN ACCT WAS ACTIVATED |
| 743 | 745 | 4,0 | APITT | TIME ACTIVATED |
| 746 | 752 | 7 | IPITB | WHO INACTIVATED |
| 753 | 755 | 5,0 | IPITD | SYSTEM DATE ACCOUNT WAS INACTIVATED IN PIT |
| 756 | 758 | 4,0 | IPITT | TIME INACTIVATED |
| 759 | 778 | 20 | FILLER | MASTER FILE FILLER |
| 779 | 782 | 7,0 | F070@1 | AMOUNT- 7,0 FILLER |
| 783 | 786 | 7,0 | F070@2 | AMOUNT- 7,0 FILLER |
| 787 | 791 | 9,2 | F092@1 | AMOUNT- 9,2 FILLER |
| 792 | 796 | 9,2 | F092@2 | AMOUNT- 9,2 FILLER |

SLOT DETAIL RATINGS FILE (File Field Description)

```
File . . . : CSPRD      Record format . : CSRRD     Record length . . . :  186
Library . : CMLIBAFMA   Type of file . . : PF        Number of fields . . :   48

From    To    Size   Key    Field       Text
   1     4    7,0           SYIDRD      CUSTOMER ACCOUNT NUMBER
   5     6    2,0           BGCYRD      BEGIN TRIP CENTURY MINUS 1
   7     8    2,0           BGYYRD      BEGIN TRIP YEAR
   9    10    2,0           BGMMRD      BEGIN TRIP MONTH
  11    12    2,0           BGDDRD      BEGIN TRIP DAY
  13    15    5,0           BGHDRD      BEGINNING HUNDRED-YEAR DATE
  16    19    6,0           BGTMRD      RATING BEGIN TIME
  20    23    7,0           SEQTRD      SEQUENCE TIME
  24    26    5,0           ENHDRD      ENDING HUNDRED-YEAR DATE
  27    30    6,0           ENTMRD      RATING END TIME
  31    33    5,0           TRHDRD      TRANS HUNDRED-YEAR DATE
  34    37    6,0           TRTMRD      TRANS TIME
  38    40    3             PRP#RD      PROPERTY ID#
  41    41    1             RTYPRD      RECORD TYPE
  42    42    1,0           SHFTRD      SHIFT 1-DAY 2-DAY 3-GRAVE
  43    46    7,2           SAVBRD      SLOT AVERAGE BET
  47    51    5             ASS#RD      ASSET NUMBER
  52    57    6             GAMCRD      GAME CODE
  58    60    3             MKTCRD      MARKETING MACHINE CODE
  61    62    2             ZONERD      SLOT MACHINE ZONE
  63    65    3             LOC3RD      LOCATION
  66    68    5,5           HLDPRD      HOLD PERCENTAGE
  69    71    5,0           CNI#RD      NUMBER OF COINS IN
  72    76    9,2           CNI$RD      AMOUNT OF COINS IN
  77    79    5,0           CNO#RD      NUMBER OF COINS OUT
  80    84    9,2           CNO$RD      AMOUNT OF COINS OUT
  85    88    7,2           LOPSRD      LENGTH OF PLAY SLOTS
  89    91    5,0           HPL5RD      HANDLE PULLS
  92    95    7,0           TCLCRD      TOTAL THEO. CALC WIN
  96    99    7,0           CMPWRD      COMP WORTH
 100   103    7,2           PNTSRD      POINTS
 104   108    9,2           SWLSRD      SLOT WIN/LOSS
 109   110    3,1           CNSHRD      COINS PER HANDLE
 111   112    3,1           #HPMRD      # HANDLES PER MINUTE
 113   114    2             DENPRD      SLOT DENOM PLAYED
 115   118    7,2           DVALRD      DENOMINATION CODE VALUE
 119   120    3,0           JP#3RD      NO. OF JACKPOTS
 121   125    9,0           JP$9RD      AMT OF JACKPOT
 126   132    7             RTBYRD      RATED BY
 133   139    7             ENTRRD      ENTERED BY
 140   149   10             WSTNRD      WORKSTN ID.
 150   159   10             USERRD      USER ID.
 160   162    5,0           BUF#RD      BUFFER COUNT
 163   163    1             RTSDRD      RT SIDE
 164   166    5,0           LCHDRD      LAST CHANGE H-DATE
 167   170    6,0           LCTMRD      LAST CHANGE TIME
```

Case 2571      -28-      Bet Guarantee System

| | | | | |
|---|---|---|---|---|
| 171 | 177 | 7 | LCIDRD | LAST CHANGE ID |
| 178 | 186 | 9 | FL9ARD | FILLER 9 ALPHA |

PATRON OPEN DAILY HISTORY FILE (File Field Description)

```
File   . . : CMPHD      Record format . : CMRHD     Record length  . . :  190
Library . : CMLIBAFMA   Type of file . . : PF       Number of fields . :   58
```

| From | To | Size | Key | Field | Text |
|---|---|---|---|---|---|
| 1 | 4 | 7,0 | | SYIDHD | PATRON ACCOUNT NUMBER |
| 5 | 8 | 6,0 | | KYDTHD | KEY DATE |
| 9 | 12 | 6,0 | | KYTMHD | KEY TIME |
| 13 | 14 | 2,0 | | DLCYHD | DAILY CENTURY MINUS 1 |
| 15 | 16 | 2,0 | | DLYYHD | DAILY YEAR |
| 17 | 18 | 2,0 | | DLMMHD | DAILY MONTH |
| 19 | 20 | 2,0 | | DLDDHD | DAILY DAY |
| 21 | 23 | 5,0 | | DLHDHD | DAILY HUNDRED-YEAR DATE |
| 24 | 25 | 2,0 | | CMPYHD | COMPANY |
| 26 | 29 | 7,0 | | AVGBHD | AVERAGE BET |
| 30 | 30 | 1 | | DINDHD | DETAIL INDICATOR |
| 31 | 34 | 7,0 | | TCLCHD | TOTAL THEO. CALC WIN |
| 35 | 36 | 3,0 | | GC#3HD | NUMBER OF GAME COUNTERCHECKS |
| 37 | 41 | 9,0 | | GC$9HD | GAME COUNTERCHECK DOLLARS |
| 42 | 43 | 3,0 | | SC#3HD | NUMBER OF SLOT COUNTERCHECKS |
| 44 | 48 | 9,0 | | SC$9HD | SLOT COUNTERCHECK DOLLARS |
| 49 | 50 | 3,0 | | GS#3HD | NUMBER OF GAME SAFEKEEPING WITHDRAWALS |
| 51 | 55 | 9,0 | | GS$9HD | GAME SAFEKEEPING WITHDRAWAL DOLLARS |
| 56 | 57 | 3,0 | | SS#3HD | NUMBER OF SLOT SAFEKEEPING WITHDRAWALS |
| 58 | 62 | 9,0 | | SS$9HD | SLOT SAFEKEEPING WITHDRAWAL DOLLARS |
| 63 | 64 | 3,0 | | TT#3HD | NO. OF COUNTERCHECK, SAFEKEEPING WITHDRAWALS |
| 65 | 69 | 9,0 | | TT$9HD | COUNTERCHECK, SAFEKEEPING WITHDRAWAL DOLLARS |
| 70 | 74 | 9,0 | | CH$9HD | TOTAL CASH DOLLARS |
| 75 | 79 | 5 | | HTLCHD | HOTEL BILLING PROFILE |
| 80 | 80 | 1 | | MTRCHD | MULT ROOM COMP CODES |
| 81 | 83 | 5,0 | | RM$5HD | ROOM COMP DOLLARS |
| 84 | 86 | 5,0 | | FD$5HD | FOOD COMP DOLLARS |
| 87 | 89 | 5,0 | | BG$5HD | BEVERAGE COMP DOLLARS |
| 90 | 92 | 5,0 | | AR$5HD | AIR COMP DOLLARS |
| 93 | 95 | 5,0 | | LM$5HD | LIMO COMP DOLLARS |
| 96 | 98 | 5,0 | | TD$5HD | TOTAL DISBURSEMENT DOLLARS |
| 99 | 101 | 5,0 | | SH$5HD | SHOW COMP DOLLARS |
| 102 | 104 | 5,0 | | OT$5HD | OTHER COMP DOLLARS |
| 105 | 108 | 7,0 | | TCMPHD | TOTAL COMP DOLLARS |
| 109 | 112 | 7,0 | | GCPWHD | GAMES COMP WORTH |
| 113 | 116 | 7,0 | | SCPWHD | SLOTS COMP WORTH |
| 117 | 120 | 7,0 | | CMPWHD | COMP WORTH |
| 121 | 124 | 7,0 | | GCLCHD | GAME THEORETICAL CALCULATED WIN |
| 125 | 129 | 9,0 | | WIN$HD | TOTAL DOLLARS WON/LOST |
| 130 | 131 | 2,0 | | GMP1HD | GAMES MOST PLAYED 1 |
| 132 | 133 | 2,0 | | GMP2HD | GAMES MOST PLAYED 2 |
| 134 | 135 | 2,0 | | GMP3HD | GAMES MOST PLAYED 3 |
| 136 | 138 | 5,0 | | GMN1HD | GAME 1 MINUTES PLAYED |
| 139 | 141 | 5,0 | | GMN2HD | GAME 2 MINUTES PLAYED |
| 142 | 144 | 5,0 | | GMN3HD | GAME 3 MINUTES PLAYED |
| 145 | 147 | 5,0 | | GMINHD | GAMES MINUTES PLAYED |
| 148 | 154 | 13,0 | | TBETHD | GAMES AVG BET MULTIPLIED BY GAME MINUTES |

| | | | | |
|---|---|---|---|---|
| 155 | 158 | 7,0 | SCLCHD | SLOT THEORETICAL CALCULATED WIN |
| 159 | 160 | 3,0 | JP#3HD | NO. OF JACKPOTS |
| 161 | 165 | 9,0 | SWLSHD | SLOT WIN/LOSS |
| 166 | 167 | 2   | DNM1HD | SLOT DENOMINATION 1 |
| 168 | 169 | 2   | DNM2HD | SLOT DENOMINATION 2 |
| 170 | 171 | 2   | DNM3HD | SLOT DENOMINATION 3 |
| 172 | 174 | 5,0 | SMN1HD | SLOT 1 MINUTES PLAYED |
| 175 | 177 | 5,0 | SMN2HD | SLOT 2 MINUTES PLAYED |
| 178 | 180 | 5,0 | SMN3HD | SLOT 3 MINUTES PLAYED |
| 181 | 183 | 5,0 | SMINHD | SLOT MINUTES PLAYED |
| 184 | 190 | 7   | GRUPHD | GROUP CODE |

PATRON OPEN TRIP HISTORY FILE    (File Field Description)

File . . : CMPHO        Record format . : CMRHO    Record length . . : 208
Library . : CMLIBAFMA   Type of file . . : PF      Number of fields . : 71

| From | To  | Size | Key | Field  | Text                                       |
|------|-----|------|-----|--------|--------------------------------------------|
| 1    | 4   | 7,0  |     | SYIDHO | PATRON ACCOUNT NUMBER                      |
| 5    | 8   | 6,0  |     | KYDTHO | KEY DATE                                   |
| 9    | 12  | 6,0  |     | KYTMHO | KEY TIME                                   |
| 13   | 14  | 2,0  |     | BGCYHO | BEGIN TRIP CENTURY MINUS 1                 |
| 15   | 16  | 2,0  |     | BGYYHO | BEGIN TRIP YEAR                            |
| 17   | 17  | 1,0  |     | BGQUHO | BEGIN TRIP QUARTER                         |
| 18   | 19  | 2,0  |     | BGMMHO | BEGIN TRIP MONTH                           |
| 20   | 21  | 2,0  |     | BGDDHO | BEGIN TRIP DAY                             |
| 22   | 24  | 5,0  |     | BGHDHO | BEGINNING HUNDRED-YEAR DATE                |
| 25   | 26  | 2,0  |     | ENCYHO | END TRIP CENTURY MINUS 1                   |
| 27   | 28  | 2,0  |     | ENYYHO | END TRIP YEAR                              |
| 29   | 29  | 1,0  |     | ENQUHO | END TRIP QUARTER                           |
| 30   | 31  | 2,0  |     | ENMMHO | END TRIP MONTH                             |
| 32   | 33  | 2,0  |     | ENDDHO | END TRIP DAY                               |
| 34   | 36  | 5,0  |     | ENHDHO | ENDING HUNDRED-YEAR DATE                   |
| 37   | 38  | 2,0  |     | CMPYHO | COMPANY                                    |
| 39   | 40  | 3,0  |     | LTRPHO | # OF DAYS SINCE LAST TRIP                  |
| 41   | 42  | 3,0  |     | #DAYHO | # OF DAYS IN TRIP                          |
| 43   | 44  | 3,0  |     | G#DYHO | NUMBER OF GAMES DAYS                       |
| 45   | 46  | 3,0  |     | S#DYHO | NUMBER OF SLOT DAYS                        |
| 47   | 48  | 3,0  |     | C#DYHO | NUMBER OF COMPED DAYS                      |
| 49   | 52  | 7,0  |     | AVGBHO | AVERAGE BET                                |
| 53   | 53  | 1    |     | DINDHO | DETAIL INDICATOR                           |
| 54   | 57  | 7,0  |     | TCLCHO | TOTAL THEO. CALC WIN                       |
| 58   | 59  | 3,0  |     | GC#3HO | NUMBER OF GAME COUNTERCHECKS               |
| 60   | 64  | 9,0  |     | GC$9HO | GAME COUNTERCHECK DOLLARS                  |
| 65   | 66  | 3,0  |     | SC#3HO | NUMBER OF SLOT COUNTERCHECKS               |
| 67   | 71  | 9,0  |     | SC$9HO | SLOT COUNTERCHECK DOLLARS                  |
| 72   | 73  | 3,0  |     | GS#3HO | NUMBER OF GAME SAFEKEEPING WITHDRAWALS     |
| 74   | 78  | 9,0  |     | GS$9HO | GAME SAFEKEEPING WITHDRAWAL                |
| 81   | 85  | 9,0  |     | SS$9HO | SLOT SAFEKEEPING WITHDRAWAL DOLLARS        |
| 86   | 87  | 3,0  |     | TT#3HO | NO. OF COUNTERCHECK, SAFEKEEPING WITHDRAWALS |
| 88   | 92  | 9,0  |     | TT$9HO | COUNTERCHECK & SAFEKEEPING DOLLARS         |
| 93   | 97  | 9,0  |     | CH$9HO | TOTAL CASH DOLLARS                         |
| 98   | 102 | 5    |     | HTLCHO | HOTEL BILLING PROFILE                      |
| 103  | 103 | 1    |     | MTRCHO | MULT ROOM COMP CODES                       |
| 104  | 106 | 5,0  |     | RM$5HO | ROOM COMP DOLLARS                          |
| 107  | 109 | 5,0  |     | FD$5HO | FOOD COMP DOLLARS                          |
| 110  | 112 | 5,0  |     | BG$5HO | BEVERAGE COMP DOLLARS                      |
| 113  | 115 | 5,0  |     | AR$5HO | AIR COMP DOLLARS                           |
| 116  | 118 | 5,0  |     | LM$5HO | LIMO COMP DOLLARS                          |
| 119  | 121 | 5,0  |     | TD$5HO | TOTAL DISBURSEMENT DOLLARS                 |
| 122  | 124 | 5,0  |     | SH$5HO | SHOW COMP DOLLARS                          |
| 125  | 127 | 5,0  |     | OT$5HO | OTHER COMP DOLLARS                         |
| 128  | 131 | 7,0  |     | TCMPHO | TOTAL COMP DOLLARS                         |
| 132  | 135 | 7,0  |     | GCPWHO | GAMES COMP WORTH                           |
| 136  | 139 | 7,0  |     | SCPWHO | SLOTS COMP WORTH                           |

Case 2571                              Bet Guarantee System

| | | | | |
|---|---|---|---|---|
| 140 | 143 | 7,0 | CMPWHO | COMP WORTH |
| 144 | 144 | 1 | CMPXHO | COMP EXCEPTION |
| 145 | 148 | 7,0 | GCLCHO | GAME THEORETICAL CALCULATED WIN |
| 149 | 153 | 9,0 | WIN$HO | TOTAL DOLLARS WON/LOST |
| 154 | 155 | 2,0 | GMP1HO | GAMES MOST PLAYED 1 |
| 156 | 157 | 2,0 | GMP2HO | GAMES MOST PLAYED 2 |
| 158 | 159 | 2,0 | GMP3HO | GAMES MOST PLAYED 3 |
| 160 | 162 | 5,0 | GMN1HO | GAME 1 MINUTES PLAYED |
| 163 | 165 | 5,0 | GMN2HO | GAME 2 MINUTES PLAYED |
| 166 | 168 | 5,0 | GMN3HO | GAME 3 MINUTES PLAYED |
| 169 | 171 | 5,0 | GMINHO | GAMES MINUTES PLAYED |
| 172 | 178 | 13,0 | TBETHO | GAMES AVG BET MULTIPLIED BY GAME MINUTES |
| 179 | 182 | 7,0 | SCLCHO | SLOT THEORETICAL CALCULATED WIN |
| 183 | 184 | 3,0 | JP#3HO | NO. OF JACKPOTS |
| 185 | 189 | 9,0 | SWL$HO | SLOT WIN/LOSS |
| 190 | 191 | 2 | DNM1HO | SLOT DENOMINATION 1 |
| 192 | 193 | 2 | DNM2HO | SLOT DENOMINATION 2 |
| 194 | 195 | 2 | DNM3HO | SLOT DENOMINATION 3 |
| 196 | 198 | 5,0 | SMN1HO | SLOT 1 MINUTES PLAYED |
| 199 | 201 | 5,0 | SMN2HO | SLOT 2 MINUTES PLAYED |
| 202 | 204 | 5,0 | SMN3HO | SLOT 3 MINUTES PLAYED |
| 205 | 207 | 5,0 | SMINHO | SLOT MINUTES PLAYED |
| 208 | 208 | 1 | IPRFHO | IN PROFILE |

PATRON CLOSED TRIP HISTORY FILE (File Field Description)

File . : CMPHC  Record format . : CMRHC  Record length . . : 208
Library . : CMLIBAFMA  Type of file . . : PF  Number of fields . : 71

| From | To | Size | Key | Field | Text |
|---|---|---|---|---|---|
| 1 | 4 | 7,0 | | SYIDHC | PATRON ACCOUNT NUMBER |
| 5 | 8 | 6,0 | | KYDTHC | KEY DATE |
| 9 | 12 | 6,0 | | KYTMHC | KEY TIME |
| 13 | 14 | 2,0 | | BGCYHC | BEGIN TRIP CENTURY MINUS 1 |
| 15 | 16 | 2,0 | | BGYYHC | BEGIN TRIP YEAR |
| 17 | 17 | 1,0 | | BGQUHC | BEGIN TRIP QUARTER |
| 18 | 19 | 2,0 | | BGMMHC | BEGIN TRIP MONTH |
| 20 | 21 | 2,0 | | BGDDHC | BEGIN TRIP DAY |
| 22 | 24 | 5,0 | | BGHDHC | BEGINNING HUNDRED-YEAR DATE |
| 25 | 26 | 2,0 | | ENCYHC | END TRIP CENTURY MINUS 1 |
| 27 | 28 | 2,0 | | ENYYHC | END TRIP YEAR |
| 29 | 29 | 1,0 | | ENQUHC | END TRIP QUARTER |
| 30 | 31 | 2,0 | | ENMMHC | END TRIP MONTH |
| 32 | 33 | 2,0 | | ENDDHC | END TRIP DAY |
| 34 | 36 | 5,0 | | ENHDHC | ENDING HUNDRED-YEAR DATE |
| 37 | 38 | 2,0 | | CMPYHC | COMPANY |
| 39 | 40 | 3,0 | | LTRPHC | # OF DAYS SINCE LAST TRIP |
| 41 | 42 | 3,0 | | #DAYHC | # OF DAYS IN TRIP |
| 43 | 44 | 3,0 | | G#DYHC | NUMBER OF GAMES DAYS |
| 45 | 46 | 3,0 | | S#DYHC | NUMBER OF SLOT DAYS |
| 47 | 48 | 3,0 | | C#DYHC | NUMBER OF COMPED DAYS |
| 49 | 52 | 7,0 | | AVGBHC | AVERAGE BET |
| 53 | 53 | 1 | | DINDHC | DETAIL INDICATOR |
| 54 | 57 | 7,0 | | TCLCHC | TOTAL THEO. CALC WIN |
| 58 | 59 | 3,0 | | GC#3HC | NUMBER OF GAME COUNTER CHECKS |
| 60 | 64 | 9,0 | | GC$9HC | GAME COUNTER CHECK DOLLARS |
| 65 | 66 | 3,0 | | SC#3HC | NUMBER OF SLOT COUNTER CHECKS |
| 67 | 71 | 9,0 | | SC$9HC | SLOT COUNTER CHECK DOLLARS |
| 72 | 73 | 3,0 | | GS#3HC | NUMBER OF GAME SAFEKEEPING WITHDRAWALS |
| 74 | 78 | 9,0 | | GS$9HC | GAME SAFEKEEPING WITHDRAWAL DOLLARS |
| 79 | 80 | 3,0 | | SS#3HC | NUMBER OF SLOT SAFEKEEPING WITHDRAWALS |
| 81 | 85 | 9,0 | | SS$9HC | SLOT SAFEKEEPING WITHDRAWAL DOLLARS |
| 86 | 87 | 3,0 | | TT#3HC | NO. OF COUNTERCHECK, SAFEKEEPING WITHDRAWALS |
| 88 | 92 | 9,0 | | TT$9HC | COUNTERCHECK, SAFEKEEPING WITHDRAWAL DOLLARS |
| 93 | 97 | 9,0 | | CH$9HC | TOTAL CASH DOLLARS |
| 98 | 102 | 5 | | HTLCHC | HOTEL BILLING PROFILE |
| 103 | 103 | 1 | | MTRCHC | MULT ROOM COMP CODES |
| 104 | 106 | 5,0 | | RM$5HC | ROOM COMP DOLLARS |
| 107 | 109 | 5,0 | | FD$5HC | FOOD COMP DOLLARS |
| 110 | 112 | 5,0 | | BG$5HC | BEVERAGE COMP DOLLARS |
| 113 | 115 | 5,0 | | AR$5HC | AIR COMP DOLLARS |
| 116 | 118 | 5,0 | | LM$5HC | LIMO COMP DOLLARS |
| 119 | 121 | 5,0 | | TD$5HC | TOTAL DISBURSEMENT DOLLARS |
| 122 | 124 | 5,0 | | SH$5HC | SHOW COMP DOLLARS |
| 125 | 127 | 5,0 | | OT$5HC | OTHER COMP DOLLARS |
| 128 | 131 | 7,0 | | TCMPHC | TOTAL COMP DOLLARS |
| 132 | 135 | 7,0 | | GCPWHC | GAMES COMP WORTH |

| | | | | |
|---|---|---|---|---|
| 136 | 139 | 7,0 | SCPWHC | SLOTS COMP WORTH |
| 140 | 143 | 7,0 | CMPWHC | COMP WORTH |
| 144 | 144 | 1 | CMPXHC | COMP EXCEPTION |
| 145 | 148 | 7,0 | GCLCHC | GAME THEORETICAL CALCULATED WIN |
| 149 | 153 | 9,0 | WIN$HC | TOTAL DOLLARS WON/LOST |
| 154 | 155 | 2,0 | GMP1HC | GAMES MOST PLAYED 1 |
| 156 | 157 | 2,0 | GMP2HC | GAMES MOST PLAYED 2 |
| 158 | 159 | 2,0 | GMP3HC | GAMES MOST PLAYED 3 |
| 160 | 162 | 5,0 | GMN1HC | GAME 1 MINUTES PLAYED |
| 163 | 165 | 5,0 | GMN2HC | GAME 2 MINUTES PLAYED |
| 166 | 168 | 5,0 | GMN3HC | GAME 3 MINUTES PLAYED |
| 169 | 171 | 5,0 | GMINHC | GAMES MINUTES PLAYED |
| 172 | 178 | 13,0 | TBETHC | GAMES AVG BET MULTIPLIED BY GAME MINUTES |
| 179 | 182 | 7,0 | SCLCHC | SLOT THEORETICAL CALCULATED WIN |
| 183 | 184 | 3,0 | JP#3HC | NO. OF JACKPOTS |
| 185 | 189 | 9,0 | SWLSHC | SLOT WIN/LOSS |
| 190 | 191 | 2 | DNM1HC | SLOT DENOMINATION 1 |
| 192 | 193 | 2 | DNM2HC | SLOT DENOMINATION 2 |
| 194 | 195 | 2 | DNM3HC | SLOT DENOMINATION 3 |
| 196 | 198 | 5,0 | SMN1HC | SLOT 1 MINUTES PLAYED |
| 199 | 201 | 5,0 | SMN2HC | SLOT 2 MINUTES PLAYED |
| 202 | 204 | 5,0 | SMN3HC | SLOT 3 MINUTES PLAYED |
| 205 | 207 | 5,0 | SMINHC | SLOT MINUTES PLAYED |
| 208 | 208 | 1 | IPRFHC | IN PROFILE |

PROMOTION CODE FILE (File Field Description)

File . . : CMPPC        Record format . : CMRPC     Record length . . :   407
Library . : CMLIBAFMA   Type of file . . : PF       Number of fields . . :   88

| From | To | Size | Key | Field | Text |
|------|-----|------|-----|--------|------|
| 1 | 2 | 2,0 | | BGCYPC | BEGINNING CENTURY |
| 3 | 4 | 2,0 | | BGYYPC | BEGIN PROMO YEAR |
| 5 | 6 | 2,0 | | BGMMPC | BEGIN PROMO MONTH |
| 7 | 8 | 2,0 | | BGDDPC | BEGIN PROMO DAY |
| 9 | 11 | 5,0 | | BGHDPC | BEGINNING HUNDRED-YEAR DATE |
| 12 | 13 | 2,0 | | ENCYPC | ENDING CENTURY |
| 14 | 15 | 2,0 | | ENYYPC | END PROMO YEAR |
| 16 | 17 | 2,0 | | ENMMPC | END PROMO MONTH |
| 18 | 19 | 2,0 | | ENDDPC | END PROMO DAY |
| 20 | 22 | 5,0 | | ENHDPC | ENDING HUNDRED-YEAR DATE |
| 23 | 25 | 3 | | PRMOPC | PROMOTION CODE |
| 26 | 26 | 1 | | MRKTPC | MARKET (I-IN O-OUT A-ALL) |
| 27 | 31 | 9,2 | | AMT$PC | PROMOTION AMT |
| 32 | 33 | 3,0 | | #DAYPC | # OF DAYS VALID |
| 34 | 34 | 1 | | ACTVPC | ACTIVE CODE |
| 35 | 36 | 3,0 | | #TR3PC | # OF TRIPS |
| 37 | 40 | 7,0 | | SPFTPC | SLOT PROFILE FROM THEO. |
| 41 | 44 | 7,0 | | SPTTPC | SLOT PROFILE TO THEO. |
| 45 | 48 | 7,0 | | STFTPC | SLOT TRIP FROM THEO. |
| 49 | 52 | 7,0 | | STTTPC | SLOT TRIP TO THEO. |
| 53 | 56 | 7,0 | | SPFWPC | SLOT PROFILE FROM W/L |
| 57 | 60 | 7,0 | | SPTWPC | SLOT PROFILE TO W/L |
| 61 | 64 | 7,0 | | STFWPC | SLOT TRIP FROM W/L |
| 65 | 68 | 7,0 | | STTWPC | SLOT TRIP TO W/L |
| 69 | 72 | 7,0 | | GPFTPC | GAME PROFILE FROM THEO. |
| 73 | 76 | 7,0 | | GPTTPC | GAME PROFILE TO THEO. |
| 77 | 80 | 7,0 | | GTFTPC | GAME TRIP FROM THEO. |
| 81 | 84 | 7,0 | | GTTTPC | GAME TRIP TO THEO. |
| 85 | 88 | 7,0 | | GPFWPC | GAME PROFILE FROM W/L. |
| 89 | 92 | 7,0 | | GPTWPC | GAME PROFILE TO W/L. |
| 93 | 96 | 7,0 | | GTFWPC | GAME TRIP FROM W/L |
| 97 | 100 | 7,0 | | GTTWPC | GAME TRIP TO W/L |
| 101 | 124 | 24 | | PDSCPC | PROMOTION DESCRIPTION |
| 125 | 132 | 8 | | CPTYPC | PROMOTION TYPE COIN |
| 133 | 152 | 20 | | CNDDPC | COIN OFFER DESCRIPTION |
| 153 | 153 | 1 | | CNOAPC | COIN OFFER ACTIVE |
| 154 | 157 | 7,2 | | CN$OPC | COIN OFFER AMOUNT |
| 158 | 161 | 7,2 | | CN$CPC | COIN OFFER AMT CONSTANT PRT |
| 162 | 165 | 7,2 | | CN$PPC | COIN OFFER AMT DIFF TO PRINT |
| 166 | 166 | 1 | | CNRPPC | COIN OFFER RECEIVES PROMO # |
| 167 | 167 | 1 | | CNICPC | COIN OFFER COMP ISSUED Y,N |
| 168 | 175 | 8 | | FDTYPC | PROMOTION TYPE FOOD |
| 176 | 195 | 20 | | FDDDPC | FOOD OFFER DESCRIPTION |
| 196 | 196 | 1 | | FDOAPC | FOOD OFFER ACTIVE |
| 197 | 200 | 7,2 | | FD$OPC | FOOD OFFER AMOUNT |
| 201 | 204 | 7,2 | | FD$1PC | FOOD AMT COUPON 1 |
| 205 | 208 | 7,2 | | FD$2PC | FOOD AMT COUPON 2 |

| | | | | |
|---|---|---|---|---|
| 209 | 212 | 7,2 | FD$3PC | FOOD AMT COUPON 3 |
| 213 | 213 | 1 | FDRPPC | FOOD OFFER RECEIVES PROMO # |
| 214 | 214 | 1 | FDICPC | FOOD OFFER - ISSUE COMP |
| 215 | 222 | 8 | OTTYPC | PROMOTION TYPE OTHR |
| 223 | 242 | 20 | OTDDPC | OTHR DESCRIPTION |
| 243 | 243 | 1 | OTOAPC | OTHR OFFER ACTIVE |
| 244 | 247 | 7,2 | OT$OPC | OTHR OFFER AMOUNT |
| 248 | 251 | 7,2 | OT$CPC | OTHR OFFER AMT CONSTANT PRT |
| 252 | 255 | 7,2 | OT$PPC | OTHR OFFER AMT DIFF TO PRINT |
| 256 | 256 | 1 | OTRPPC | OTHR OFFER RECEIVES PROMO # |
| 257 | 257 | 1 | OTICPC | OTHR OFFER - ISSUE COMP |
| 258 | 265 | 8 | RMTYPC | PROMOTION TYPE ROOM |
| 266 | 285 | 20 | RMDDPC | ROOM OFFER DESCRIPTION |
| 286 | 286 | 1 | RMOAPC | ROOM OFFER ACTIVE |
| 287 | 290 | 7,2 | RM$OPC | ROOM OFFER AMOUNT |
| 291 | 294 | 7,2 | RM$CPC | ROOM OFFER AMT CONSTANT PRT |
| 295 | 298 | 7,2 | RM$PPC | ROOM OFFER AMT DIFF TO PRINT |
| 299 | 299 | 1 | RMRPPC | ROOM OFFER RECEIVES PROMO # |
| 300 | 300 | 1 | RMICPC | ROOM OFFER - ISSUE COMP |
| 301 | 308 | 8 | SHTYPC | PROMOTION TYPE SHOW |
| 309 | 328 | 20 | SHDDPC | SHOW DESCRIPTION |
| 329 | 329 | 1 | SHOAPC | SHOW OFFER ACTIVE |
| 330 | 333 | 7,2 | SH$OPC | SHOW OFFER AMOUNT |
| 334 | 337 | 7,2 | SH$CPC | SHOW OFFER AMT CONSTANT PRT |
| 338 | 341 | 7,2 | SH$PPC | SHOW OFFER AMT DIFF TO PRINT |
| 342 | 342 | 1 | SHRPPC | SHOW OFFER RECEIVES PROMO # |
| 343 | 343 | 1 | SHICPC | SHOW OFFER - ISSUE COMP |
| 344 | 351 | 8 | TRTYPC | PROMOTION TYPE TRAN |
| 352 | 371 | 20 | TRDDPC | TRAN DESCRIPTION |
| 372 | 372 | 1 | TROAPC | TRAN OFFER ACTIVE |
| 373 | 376 | 7,2 | TR$OPC | TRAN OFFER AMOUNT |
| 377 | 380 | 7,2 | TR$CPC | TRAN OFFER AMT CONSTANT PRT |
| 381 | 384 | 7,2 | TR$PPC | TRAN OFFER AMT DIFF TO PRINT |
| 385 | 385 | 1 | TRRPPC | TRAN OFFER RECEIVES PROMO # |
| 386 | 386 | 1 | TRICPC | TRAN OFFER - ISSUE COMP |
| 387 | 387 | 1 | CTSTPC | CARD TEST |
| 388 | 394 | 7 | APIDPC | APPROVER |
| 395 | 401 | 7 | ENTRPC | ENTERED BY |
| 402 | 404 | 5,0 | TRHDPC | TRANSACTION HUNDRED-YEAR DATE |
| 405 | 405 | 1 | FTRDPC | FIRST TIME REDEMPTION |
| 406 | 407 | 2 | PRTTPC | PRINT TYPE |

DOWNLOAD PROMOTIONS FILE (File Field Description)

File . . : CMPWUP      Record format . : CMRUP     Record length . . :   665
Library . : CMLIBAFMA  Type of file . . : PF        Number of fields . . :   75

| From | To  | Size | Key | Field  | Text |
|------|-----|------|-----|--------|------|
| 1    | 4   | 7,0  |     | SYIDUP | PATRON ACCOUNT NUMBER |
| 5    | 8   | 6,0  |     | KYDTUP | KEY DATE |
| 9    | 12  | 6,0  |     | KYTMUP | KEY TIME |
| 13   | 22  | 10   |     | NMKYUP | NAME KEY |
| 23   | 55  | 33   |     | ANAMUP | PATRON NAME IN LAST, FIRST MI FORMAT |
| 56   | 75  | 20   |     | FN20UP | PATRON FIRST NAME |
| 76   | 76  | 1    |     | MNAMUP | MIDDLE INITIAL |
| 77   | 93  | 17   |     | LNAMUP | LAST NAME |
| 94   | 126 | 33   |     | F133UP | ADDRESS 1 FIELD |
| 127  | 159 | 33   |     | F233UP | ADDRESS 2 FIELD |
| 160  | 192 | 33   |     | F333UP | ADDRESS 3 FIELD |
| 193  | 225 | 33   |     | F433UP | ADDRESS 4 FIELD |
| 226  | 228 | 3    |     | PRMOUP | PROMOTION CODE |
| 229  | 230 | 2    |     | PRTTUP | PRINT TYPE |
| 231  | 235 | 9,2  |     | AMT$UP | AMOUNT |
| 236  | 238 | 5,0  |     | TRHDUP | TRANS H-DATE |
| 239  | 241 | 5,0  |     | EXHDUP | EXPIRE H-DATE |
| 242  | 248 | 7    |     | ENTRUP | ENTERED BY |
| 249  | 256 | 8    |     | CPTYUP | PROMOTION TYPE COIN |
| 257  | 276 | 20   |     | CNDDUP | COIN OFFER DESCRIPTION |
| 277  | 277 | 1    |     | CNOAUP | COIN OFFER ACTIVE |
| 278  | 281 | 7,2  |     | CN$OUP | COIN OFFER AMOUNT |
| 282  | 285 | 7,2  |     | CN$CUP | COIN OFFER AMT CONSTANT PRT |
| 286  | 289 | 7,2  |     | CN$PUP | COIN OFFER AMT DIFF TO PRINT |
| 290  | 290 | 1    |     | CNRPUP | COIN OFFER RECEIVES PROMO # |
| 291  | 295 | 9,0  |     | CNP#UP | COIN OFFER PROMO # |
| 296  | 337 | 42   |     | DATEUP | EXPIRATION DATE TEXT |
| 338  | 357 | 20   |     | DOLAUP | DOLLAR AMOUNT TEXT - SHORT |
| 358  | 393 | 36   |     | DOLLUP | DOLLAR AMOUNT TEXT |
| 394  | 396 | 5,0  |     | DPLYUP | # OF DAYS PLAYED |
| 397  | 404 | 8    |     | FDTYUP | PROMOTION TYPE FOOD |
| 405  | 424 | 20   |     | FDDDUP | FOOD OFFER DESCRIPTION |
| 425  | 425 | 1    |     | FDOAUP | FOOD OFFER ACTIVE |
| 426  | 429 | 7,2  |     | FD$OUP | FOOD OFFER AMOUNT |
| 430  | 433 | 7,2  |     | FD$1UP | FOOD AMT COUPON 1 |
| 434  | 438 | 9,0  |     | FD#1UP | FOOD OFFER 1 PROMO # |
| 439  | 442 | 7,2  |     | FD$2UP | FOOD AMT COUPON 2 |
| 443  | 447 | 9,0  |     | FD#2UP | FOOD OFFER 2 PROMO # |
| 448  | 451 | 7,2  |     | FD$3UP | FOOD AMT COUPON 3 |
| 452  | 456 | 9,0  |     | FD#3UP | FOOD OFFER 3 PROMO # |
| 457  | 457 | 1    |     | FDRPUP | FOOD OFFER RECEIVES PROMO # |
| 458  | 465 | 8    |     | OTTYUP | PROMOTION TYPE OTHR |
| 466  | 485 | 20   |     | OTDDUP | OTHR DESCRIPTION |
| 486  | 486 | 1    |     | OTOAUP | OTHR OFFER ACTIVE |
| 487  | 490 | 7,2  |     | OT$OUP | OTHR OFFER AMOUNT |
| 491  | 494 | 7,2  |     | OT$CUP | OTHR OFFER AMT CONSTANT PRT |
| 495  | 498 | 7,2  |     | OT$PUP | OTHR OFFER AMT DIFF TO PRINT |

Case 2571                                    -38-                           Bet Guarantee System

| | | | | |
|---|---|---|---|---|
| 499 | 499 | 1 | OTRPUP | OTHR OFFER RECEIVES PROMO # |
| 500 | 504 | 9,0 | OTP#UP | OTHR OFFER PROMO # |
| 505 | 512 | 8 | RMTYUP | PROMOTION TYPE ROOM |
| 513 | 532 | 20 | RMDDUP | ROOM OFFER DESCRIPTION |
| 533 | 533 | 1 | RMOAUP | ROOM OFFER ACTIVE |
| 534 | 537 | 7,2 | RM$OUP | ROOM OFFER AMOUNT |
| 538 | 541 | 7,2 | RM$CUP | ROOM OFFER AMT CONSTANT PRT |
| 542 | 545 | 7,2 | RM$PUP | ROOM OFFER AMT DIFF TO PRINT |
| 546 | 546 | 1 | RMRPUP | ROOM OFFER RECEIVES PROMO # |
| 547 | 551 | 9,0 | RMP#UP | ROOM OFFER PROMO # |
| 552 | 570 | 19 | REDDUP | ROOM EXPIRATION DATE DESC. |
| 571 | 578 | 8 | SHTYUP | PROMOTION TYPE SHOW |
| 579 | 598 | 20 | SHDDUP | SHOW DESCRIPTION |
| 599 | 599 | 1 | SHOAUP | SHOW OFFER ACTIVE |
| 600 | 603 | 7,2 | SH$OUP | SHOW OFFER AMOUNT |
| 604 | 607 | 7,2 | SH$CUP | SHOW OFFER AMT CONSTANT PRT |
| 608 | 611 | 7,2 | SH$PUP | SHOW OFFER AMT DIFF TO PRINT |
| 612 | 612 | 1 | SHRPUP | SHOW OFFER RECEIVES PROMO # |
| 613 | 617 | 9,0 | SHP#UP | SHOW OFFER PROMO # |
| 618 | 625 | 8 | TRTYUP | PROMOTION TYPE TRAN |
| 626 | 645 | 20 | TRDDUP | TRAN DESCRIPTION |
| 646 | 646 | 1 | TROAUP | TRAN OFFER ACTIVE |
| 647 | 650 | 7,2 | TR$OUP | TRAN OFFER AMOUNT |
| 651 | 654 | 7,2 | TR$CUP | TRAN OFFER AMT CONSTANT PRT |
| 655 | 658 | 7,2 | TR$PUP | TRAN OFFER AMT DIFF TO PRINT |
| 659 | 659 | 1 | TRRPUP | TRAN OFFER RECEIVES PROMO # |
| 660 | 664 | 9,0 | TRP#UP | TRAN OFFER PROMO # |
| 665 | 665 | 1 | PL1TUP | 1ST TIME PLAY |

PROCESSED PROMOTIONS FILE (File Field Description)

```
File    . . : CMPPP       Record format  . : CMRPP     Record length   . . :  86
Library . : CMLIBAFMA     Type of file . . : PF        Number of fields . :  18

From To   Size   Key       Field     Text
  1  4    7,0    SYIDPP    PATRON ACCOUNT NUMBER
  5  9    9,0    PRM#PP    PROMOTION NO.
 10 13    6,0    KYDTPP    KEY DATE
 14 17    6,0    KYTMPP    KEY TIME
 18 20    3      PRMOPP    PROMOTION CODE
 21 40   20      DESCPP    DESCRIPTION
 41 42    2      PRTTPP    PRINT TYPE
 43 47    9,2    AMT$PP    AMOUNT
 48 52    9,2    AMTRPP    AMOUNT REDEEMDED
 53 55    5,0    TRHDPP    TRANS HUNDRED-YEAR DATE
 56 58    5,0    EXHDPP    EXPIRE HUNDRED-YEAR DATE
 59 66    8      PTYPPP    PROMOTION TYPE
 67 69    5,0    REHDPP    REDEEM 100YR
 70 73    6,0    REKDPP    REDEEMED KEY DATE
 74 77    6,0    REKTPP    REDEEMED KEY TIME
 78 84    7      ENTRPP    ENTERED BY
 85 85    1      PL1TPP    1ST TIME PLAY
 86 86    1      STSCPP    STATUS CODE
```

Case 2571      -40-      Bet Guarantee System

BET GUARANTEE FILE (File Field Description)

```
File   .. : CMPHH         Record format  . : CMRHH  Record length  . . :   39
Library. : CMLIBAFMA  Type of file . . : PF    Number of fields . :   13

From To  Size  Key     Field      Text
  1  4  7,0            SYIDHH     PATRON ACCOUNT NUMBER
  5  8  6,0            KYDTHH     KEY DATE
  9 12  6,0            KYTMHH     KEY TIME
 13 15  5,0            BGHDHH     DATE STARTED OFFER
 16 18  5,0            OEHDHH     OFFER END DATE
 19 21  5,0            AEHDHH     ACTUAL END DATE
 22 23  3,0            #TR3HH     NUMBER TRIPS
 24 24  1              ACTVHH     ACTIVE CODE
 25 27  3              COD1HH     PROMO CODE TRIP 1
 28 30  3              COD2HH     PROMO CODE TRIP 2
 31 33  3              COD3HH     PROMO CODE TRIP 3
 34 36  3              COD4HH     PROMO CODE TRIP 4
 37 39  3              COD5HH     PROMO CODE TRIP 5
```

We claim:

1. A computer implemented method of providing a bet guarantee to any of a plurality of patrons of a casino, comprising:
- tracking individual patron gaming at any of a predetermined type of gaming machine to generate a patron rating for the patron, each patron rating including an amount lost by the patron during the rating, the predetermined type of gaming machine having a specified denomination;
- determining from all patron ratings generated during the trip an amount lost in a selected time interval during the trip;
- calculating a bet guarantee amount as a function of the amount lost during the selected time interval; and,
- generating a redeemable coupon for the bet guarantee amount for the patron.

2. The computer implemented method of claim 1, wherein determining from all patron ratings generated during the trip an amount lost in a selected time interval during the trip further comprises:
- accumulating patron ratings for each day of a patron's trip into a daily rating summary for the patron, each daily rating summary including an amount lost by the patron for the day;
- determining whether the patron's trip has terminated; and,
- responsive to the patron's trip terminating, accumulating the daily rating summaries into a trip rating summary, the trip rating summary including an amount lost by the patron during the trip.

3. The computer implemented method of claim 1, wherein calculating a bet guarantee amount as a function of the amount lost during the selected time interval, comprises:
- calculating the bet guarantee amount as the greater of:
  - an amount lost by the patron during a first time interval of patron ratings on at least one of the predetermined type of gaming machines;
  - a percentage of an amount lost by the patron from patron ratings for the predetermined type of game machines during the trip; and,
  - a percentage of a theoretical win amount from patron ratings for the predetermined type of game machines during the trip.

4. In a casino including a plurality of gaming machines, each gaming machine having a type and a denomination, a casino management system for providing a bet guarantee coupon to patron of a casino, comprising:
- a computer system including:
  - a processor communicatively coupled to the gaming machines to receive therefrom a patron rating generated in response to a period of patron gaming at the gaming machine, each patron rating including an amount lost by the patron during the period of patron gaming;
  - a database management system communicatively coupled to the processor for receiving therefrom a plurality of patron ratings, and including:
    - a ratings file for storing the plurality of patron ratings, the processor determining from patron ratings for a predetermined type and denomination of gaming machine an amount lost by the patron during a first time interval of patron gaming, the first time interval including one or more patron ratings, and calculating as a function of the amount lost a bet guarantee amount;
  - a word processing device for receiving from the computer system the bet guarantee amount and generating a bet guarantee coupon redeemable for the bet guarantee amount and uniquely associated with the patron.

5. The casino management system of claim 4, wherein the database management system further comprises:
- a daily rating file for storing for each patron, a daily rating summary derived from individual patron ratings for a patron on a single day; and
- a trip rating file for storing for each patron at least one trip rating summary, each trip rating summary derived from at least one daily rating summary for an individual patron; the processor deriving the bet guarantee amount from the trip rating summary for an individual patron as the greater of:
  - an amount lost by the patron during the first time interval of patron ratings on at least one of the predetermined type and denomination of gaming machines;
  - a percentage of an amount lost by the patron from patron ratings for the predetermined type and denomination of game machines during the trip; and,
  - a percentage of a theoretical win amount from patron ratings for the predetermined type and denomination of game machines during the trip.

* * * * *